(12) United States Patent
Sugita

(10) Patent No.: US 11,403,780 B2
(45) Date of Patent: Aug. 2, 2022

(54) CAMERA CALIBRATION DEVICE AND CAMERA CALIBRATION METHOD

(71) Applicant: FANUC CORPORATION, Yamanashi (JP)

(72) Inventor: Yuuki Sugita, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 379 days.

(21) Appl. No.: 16/592,073

(22) Filed: Oct. 3, 2019

(65) Prior Publication Data
US 2020/0151907 A1 May 14, 2020

(30) Foreign Application Priority Data
Nov. 14, 2018 (JP) .............................. JP2018-213798

(51) Int. Cl.
*G06T 7/80* (2017.01)
*B23Q 17/22* (2006.01)
*G01B 11/03* (2006.01)

(52) U.S. Cl.
CPC ............ *G06T 7/80* (2017.01); *B23Q 17/2233* (2013.01); *G01B 11/03* (2013.01); *G06T 2207/30108* (2013.01)

(58) Field of Classification Search
CPC ............ G06T 7/80; G06T 2207/30108; G06T 2207/30208; B23Q 17/2233; G01B 11/03;
(Continued)

(56) References Cited

U.S. PATENT DOCUMENTS 5,793,221 A * 8/1998 Aoki ..................... G02F 1/1309
324/760.01
9,239,230 B2 * 1/2016 Chang ..................... G01B 11/03
(Continued)

FOREIGN PATENT DOCUMENTS

CN 101065969 10/2007
CN 101836451 9/2010
(Continued)

OTHER PUBLICATIONS

Notification of Reasons for Refusal dated Dec. 8, 2020 in Japanese Patent Application No. 2018-213798.
(Continued)

*Primary Examiner* — Emily C Terrell
*Assistant Examiner* — Molly Wilburn
(74) *Attorney, Agent, or Firm* — Wenderoth, Lind & Ponack, L.L.P.

(57) ABSTRACT

To provide a camera calibration device and a camera calibration method which can easily calibrate a relationship between a machine coordinate system of a machine tool and a camera coordinate system of a camera. A camera calibration device calibrates an imaging means of a machine tool, the machine tool includes: a touch probe which acquires one point whose machine coordinates are known; a camera which images the one point and a pattern including a feature used for calibration; and a drive mechanism which moves a table or a spindle in two orthogonal directions and an image obtained by imaging the one point and the pattern and images obtained by imaging the pattern or/and the one point when the table or a machining machine is moved in the two directions are used to calculate an external parameter by calculating a positional posture relationship between the machine coordinate system and the pattern.

7 Claims, 19 Drawing Sheets

(58) Field of Classification Search
CPC .. G01B 5/004; G01B 21/042; H04N 5/23222; H04N 5/23299
See application file for complete search history.

(56) References Cited

U.S. PATENT DOCUMENTS

| | | | | |
|---|---|---|---|---|
| 9,946,955 | B2* | 4/2018 | Oh | G06K 9/6202 |
| 10,839,557 | B1* | 11/2020 | Arora | H04N 13/246 |
| 2007/0154088 | A1* | 7/2007 | Goh | G06K 9/4652 |
| | | | | 382/167 |
| 2010/0302366 | A1* | 12/2010 | Zhao | G06T 7/80 |
| | | | | 348/142 |
| 2015/0324968 | A1* | 11/2015 | Gold | G03F 7/70516 |
| | | | | 348/95 |
| 2021/0356849 | A1* | 11/2021 | McNeeley | D05B 35/12 |

FOREIGN PATENT DOCUMENTS

| | | |
|---|---|---|
| CN | 108297096 | 7/2018 |
| EP | 2 413 282 | 2/2012 |
| JP | 2003-50106 | 2/2003 |
| JP | 2009-288152 | 12/2009 |
| JP | 2010-276603 | 12/2010 |
| JP | 2013-96863 | 5/2013 |
| JP | 2014-226754 | 12/2014 |

OTHER PUBLICATIONS

Office Action dated Oct. 18, 2021 in corresponding Chinese Patent Application No. 201911099906.2.

* cited by examiner

CAMERA CALIBRATION DEVICE AND CAMERA CALIBRATION METHOD

This application is based on and claims the benefit of priority from Japanese Patent Application No. 2018-213798, filed on 14 Nov. 2018, the content of which is incorporated herein by reference.

BACKGROUND OF THE INVENTION

Field of the Invention

The present invention relates to a camera calibration device and a camera calibration method which calibrate a relationship between a machine coordinate system set on a machine tool and a camera coordinate system of a camera installed in the machine tool.

Related Art

Conventionally, as a method of calibrating a relationship between a machine coordinate system set on a machine tool and an image coordinate system of a camera installed in the machine tool, a method is known which uses a calibration instrument of a checkerboard, a dot pattern or the like. For example, in the method described above, the calibration instrument is installed in a certain predetermined place which is stationary with respect to the camera and whose machine coordinates are known so as to detect, for example, an intersection of the checkerboard, a dot and the center point of a marker, these are set to corresponding points and thus a large number of corresponding points are obtained by one round of imaging.

However, in this method, a dedicated jig for installing the calibration instrument in the certain predetermined place whose machine coordinates are known is needed for each of the machine tools. Moreover, labor for using the jig to install the calibration instrument in the specified place is needed.

In this point, for example, patent document 1 proposes a technology in which a plurality of images obtained by performing imaging while moving a table of a machine tool with a mark provided in an arbitrary position from a reference position parallel to the directions of X and Y axes and a plurality of images obtained by performing imaging while rotatively moving the table about the reference position within an XY plane are used so as to perform calibration on a camera.

Patent document 2 proposes a technology in which an imaging target member of a calibration pattern having one feature point is fitted to the spindle of a machine tool, and in which a plurality of images of the imaging target member obtained by performing imaging while the spindle is being moved in each of the directions of X, Y and Z axes are used so as to perform calibration on a camera based on a plurality of sets of data where positions in images indicating the same feature point are associated with positions in a machine coordinate system.

Patent Document 1: Japanese Unexamined Patent Application, Publication No. 2003-050106
Patent Document 2: Japanese Unexamined Patent Application, Publication No. 2010-276603

SUMMARY OF THE INVENTION

In patent document 1, since the degree of flexibility of an operation in which the table of the machine tool can be rotatively moved about the reference position in the XY plane together with parallel movements in the directions of the X and Y axes is high, one mark is provided on the table, and thus it is possible to perform the calibration on the camera.

However, when a table can be only moved parallel to the directions of the X and Y axes or is fixed to a machine tool, that is, when the degree of flexibility is low, it is difficult to apply the technology of patent document 1 thereto. A method of aligning a Z axis in a machine coordinate system is not clear.

On the other hand, although patent document 2 can be applied to machine tools such as a table movable-type three-axis machine and a movable-type three-axis machine in which only a spindle can be moved, a calibration instrument of the imaging target member or the like for calibration and a jig for fixing the calibration instrument to a table or the like are needed, with the result that significant labor and cost are needed.

An object of the present invention is to provide a camera calibration device and a camera calibration method in which a calibration instrument is arranged in an arbitrary position of a machine tool in an arbitrary posture and in which thus it is possible to easily calibrate a relationship between a machine coordinate system set on the machine tool and a camera coordinate system of a camera installed in the machine tool.

(1) A camera calibration device (a "camera calibration device 100" which will be described later) of the present invention is a camera calibration device which calibrates an imaging means included in a machine tool, the machine tool (a "machine tool 200" which will be described later) includes: an acquisition means (a "touch probe 240" which will be described later) which acquires one point whose machine coordinates are known; the imaging means (a "camera 230" which will be described later) which images the one point (a "touch point TP" which will be described later) whose machine coordinates are known and a pattern including a feature used for calibration; and a drive mechanism which linearly moves a table (a "table 220" which will be described later) or a spindle (a "machining machine 210" which will be described later) in two orthogonal directions in a machine coordinate system, and an image obtained by imaging the one point whose machine coordinates are known and the pattern including the feature used for the calibration and images obtained by imaging the pattern including the feature used for the calibration or/and the one point whose machine coordinates are known when the drive mechanism linearly moves the table or the spindle in the two orthogonal directions in the machine coordinate system are used to calculate a positional posture relationship between the machine coordinate system and the pattern including the feature used for the calibration such that an external parameter indicating a positional posture relationship between the machine coordinate system and a camera coordinate system is calculated.

(2) In the camera calibration device described in (1), as the pattern including the feature used for the calibration, calibration instruments of a checkerboard and a dot pattern arranged in an arbitrary positional posture with respect to the machine coordinate system may be included.

(3) In the camera calibration device described in (1), as the pattern including the feature used for the calibration, a scratch, a corner point and a pattern on the table may be included.

(4) In the camera calibration device described in any one of (1) to (3), when a plane formed with a pattern including a plurality of features used for the calibration is parallel to a plane of the machine coordinate system, the external parameter of the imaging means may be calculated by an operation of the drive mechanism in one direction.

(5) A camera calibration method of the present invention is a camera calibration method of calibrating an imaging means which is realized by a computer and which is included in a machine tool, the machine tool includes: an acquisition means which acquires one point whose machine coordinates are known; the imaging means which images the one point whose machine coordinates are known and a pattern including a feature used for calibration; and a drive mechanism which linearly moves a table or a spindle in two orthogonal directions in a machine coordinate system, and an image obtained by imaging the one point whose machine coordinates are known and the pattern including the feature used for the calibration and images obtained by imaging the pattern including the feature used for the calibration or/and the one point whose machine coordinates are known when the drive mechanism linearly moves the table or the spindle in the two orthogonal directions in the machine coordinate system are used to calculate a positional posture relationship between the machine coordinate system and the pattern including the feature used for the calibration such that an external parameter indicating a positional posture relationship between the machine coordinate system and a camera coordinate system is calculated.

According to the present invention, a calibration instrument is arranged in an arbitrary position of a machine tool in an arbitrary posture, and thus it is possible to easily calibrate a relationship between a machine coordinate system set on the machine tool and an image coordinate system of a camera installed in the machine tool.

DETAILED DESCRIPTION OF THE INVENTION

Embodiments of the present invention will be described below.

First Embodiment

Figure 1A:
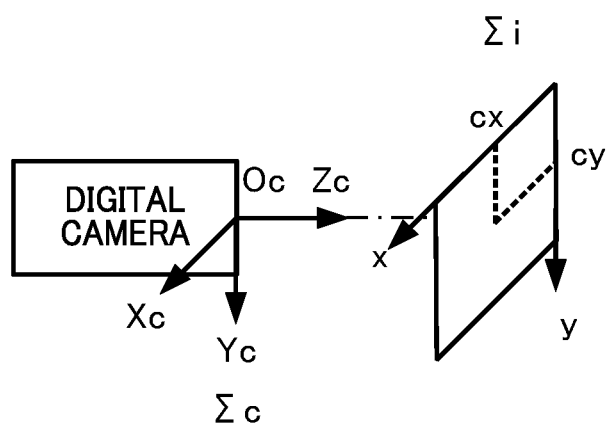
FIG. 1A is a diagram showing an example of a camera coordinate system and an image coordinate system.
Figure 1B:
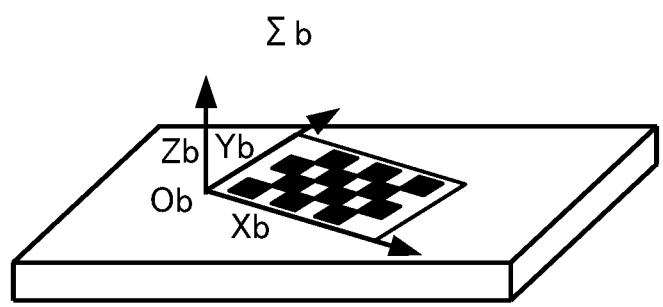
FIG. 1B is a diagram showing an example of a checkerboard coordinate system.
Figure 1C:
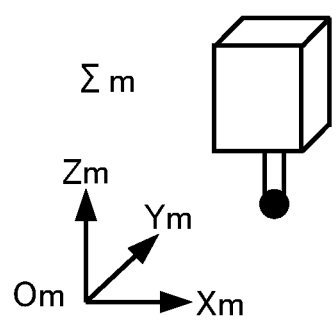
FIG. 1C is a diagram showing an example of a machine coordinate system.

A first embodiment will be described. Before the description of the first embodiment, a camera coordinate system $\Sigma c$, an image coordinate system $\Sigma i$, a checkerboard coordinate system $\Sigma b$ and a machine coordinate system $\Sigma m$ will be described with reference to FIGS. 1A, 1B and 1C. FIG. 1A is a diagram showing a relationship between the camera coordinate system $\Sigma c$ and the image coordinate system $\Sigma i$. FIG. 1B is a diagram showing an example of the checkerboard coordinate system $\Sigma b$. FIG. 1C is a diagram showing an example of the machine coordinate system $\Sigma m$.

As shown in FIG. 1A, the camera coordinate system $\Sigma c$ is a three-dimensional coordinate system in which the optical center Oc of a digital camera is assumed to be an origin and in which a rightward direction from the origin Oc is assumed to be an Xc axis, a downward direction is assumed to be a Yc axis and the direction of an optical axis is assumed to be a Zc axis. The image coordinate system $\Sigma i$ is a two-dimensional cartesian coordinate system which is parallel to the camera coordinate system $\Sigma c$, in which an upper left part of an image plane separated by a focal length f from the origin Oc is assumed to be an origin and which has an x axis and a y axis in directions that are respectively parallel to the Xc axis and the Yc axis. As shown in FIG. 1B, in the checkerboard coordinate system $\Sigma b$, for example, a lower left part of a checkerboard pattern is assumed to be an origin Ob. The checkerboard coordinate system $\Sigma b$ is a three-dimensional coordinate system in which a direction perpendicular to the surface of the checkerboard from the origin Ob is assumed to be a Zb axis, in which a rightward direction on the surface of the checkerboard from the origin Ob is assumed to be an Xb axis and in which an upward direction on the surface of the checkerboard from the origin Ob is assumed to be a Yb axis.

As shown in FIG. 1C, the machine coordinate system Σm is a three-dimensional coordinate system in which a machine origin Om is a center, and which has a Xm axis, a Ym axis and a Zm axis from the origin Om.

It is known that in the case of an ideal lens without any distortion aberration, a point on a space represented by coordinates (Xm, Ym, Zm) in the machine coordinate system Σm of a machine tool is projected on (x, y) in the image coordinate system Σi by linear transformation as indicated in formula (1).

[Math. 1]

$$\alpha \begin{pmatrix} x \\ y \\ 1 \end{pmatrix} = \begin{pmatrix} f & s & c_x \\ 0 & f & c_y \\ 0 & 0 & 1 \end{pmatrix} \begin{pmatrix} r11 & r12 & r13 & t_x \\ r21 & r22 & r23 & t_y \\ r31 & r32 & r33 & t_z \\ 0 & 0 & 0 & 1 \end{pmatrix} \begin{pmatrix} X_m \\ Y_m \\ Z_m \\ 1 \end{pmatrix} \quad (1)$$

Here, s represents a shear coefficient of a pixel. ($c_x$, $c_y$) represents the center coordinates of an image. The first 3×3 matrix in the right side is an internal parameter K and indicates a relationship between the camera coordinate system Σc and the image coordinate system Σi. The second 3×4 matrix in the right side is an external parameter and indicates a posture R and a positional relationship t of the camera coordinate system Σc with respect to the machine coordinate system Σm.

In an actual lens, distortion aberration in a radial direction and distortion aberration in a tangent direction are present. For example, when the distortion aberration in the radial direction of the lens (radial distortion) is considered, image coordinates (x, y) are distorted by nonlinear transformation as indicated in formula (2).

[Math. 2]

$$x_{distorted} = (x - c_x)(1 + \kappa_1 r + \kappa_2 r^2) + c_x$$

$$y_{distorted} = (y - c_y)(1 + \kappa_1 r + \kappa_2 r^2) + c_y \quad (2)$$

$\kappa_1$ and $\kappa_2$ represent distortion aberration coefficients. Moreover, $r = ((x - c_x)^2 + (y - c_y)^2)^{1/2}$ holds true. In camera calibration, by a method known to a person skilled in the art, it is possible to previously determine the distortion aberration coefficients $\kappa_1$ and $\kappa_2$ in addition to the internal parameter K of a camera. In the following description, it is assumed that a camera calibration device 100 performs calibration processing based on an image which is obtained by performing imaging with a camera 230 and whose distortion is compensated for with the distortion aberration coefficients $\kappa_1$ and $\kappa_2$ previously calculated.

In the first embodiment, as a first stage, by a method known to a person skilled in the art (for example, a method of Tsai (Tsai, Roger Y. (1987) "A Versatile Camera Calibration Technique for High-Accuracy 3D Machine Vision Metrology Using Off-the-Shelf TV Cameras and Lenses," IEEE Journal of Robotics and Automation, Vol. RA-3, No. 4, pp. 323-344, August 1987)), the camera calibration device 100 determines an internal parameter of the camera and a posture $R_c$ and a positional relationship $t_c$ of the camera coordinate system Σc with respect to the checkerboard coordinate system Σb from an image obtained by performing imaging with the camera when one point on a checkerboard installed in an arbitrary position of a table 220 is obtained as one point whose machine coordinates are known in the machine coordinate system Σm.

In this way, it is possible to obtain a relationship between the checkerboard coordinate system Σb and the camera coordinate system Σc. Specifically, a point on a space represented by coordinates ($X_b$, $Y_b$, $Z_b$) in the checkerboard coordinate system Σb is subjected to linear transformation using formula (3), and can thereby be represented by coordinates ($X_c$, $Y_c$, $Z_c$) in the camera coordinate system Σc.

[Math. 3]

$$\begin{pmatrix} X_c \\ Y_c \\ Z_c \end{pmatrix} = R_c \begin{pmatrix} X_b \\ Y_b \\ Z_b \end{pmatrix} + t_c \quad (3)$$

Then, as a second stage, as will be described later, the camera calibration device 100 uses an image obtained by imaging one point whose machine coordinates are known and the one known point and an image obtained by performing imaging when the machine tool makes linear axis movements in two directions so as to determine the posture R of the camera coordinate system Σc with respect to the machine coordinate system Σm.

Furthermore, as a third stage, the camera calibration device 100 calculates, from the image obtained by imaging the one point whose machine coordinates are known, based on the internal parameter of the camera and formula (3), coordinates ($X_{tb}$, $Y_{tb}$, $Z_{tb}$) of the one point whose machine coordinates are known in the checkerboard coordinate system Σb. On the other hand, when the machine coordinates are assumed to be coordinates ($X_{tm}$, $Y_{tm}$, $Z_{tm}$) of one known point in the machine coordinate system Σm, the camera calibration device 100 determines the positional relationship t of the camera coordinate system Σc with respect to the machine coordinate system Σm.

In this way, the camera calibration device 100 can calibrate a relationship between the machine coordinate system Σm set on the machine tool and the camera coordinate system Σc of the camera installed in the machine tool.

As described above, in the first embodiment, the posture and the positional relationship of the camera coordinate system Σc with respect to the machine coordinate system Σm are calculated through the checkerboard coordinate system Σb set on the checkerboard.

The first embodiment will be described in detail below.

Figure 2:
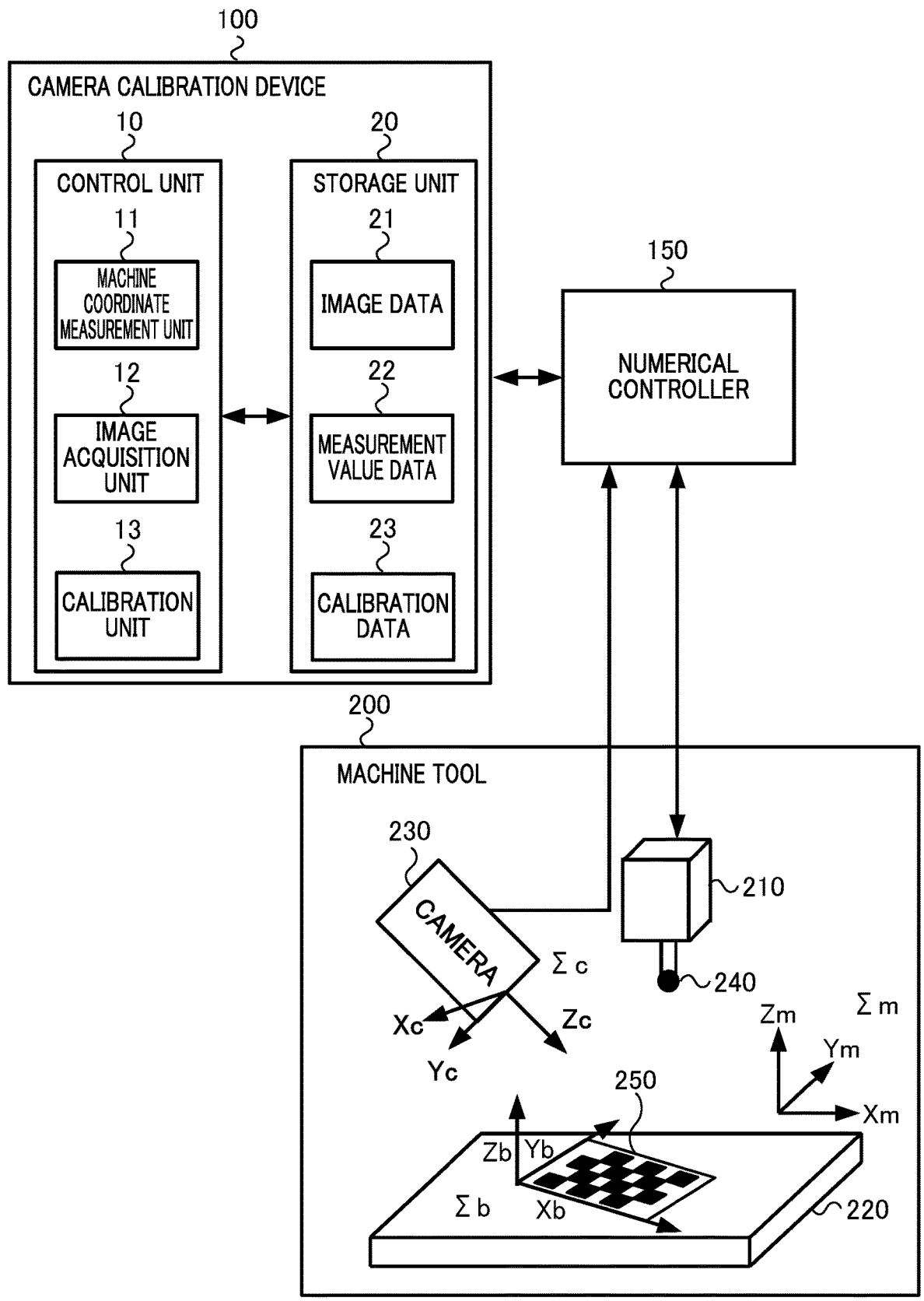
FIG. 2 is a diagram showing an example of a camera calibration device according to a first embodiment of the present invention.

FIG. 2 is a diagram showing an example of the camera calibration device 100 according to the first embodiment of the present invention.

The camera calibration device 100 according to the first embodiment is a computer which includes a control unit 10 such as a processor and a storage unit 20 such as a hard disk device. The camera calibration device 100 has an interface function, such as an input/output device and a communication interface, with an external device. In this way, the camera calibration device 100 is connected through a wired or wireless connection to an external numerical controller 150.

The camera calibration device 100 may be connected through a network to the numerical controller 150.

The numerical controller 150 is a controller known to a person skilled in the art, and controls the operation of the machine tool 200.

The machine tool 200 is, for example, a table movable-type three-axis machine, and includes a machining machine (tool spindle device) 210, the table 220 and the camera 230. The machine tool 200 is connected to the numerical controller 150.

The machining machine 210 is, for example, a spindle unit, and is moved in the direction of the Zm axis in the machine coordinate system Σm based on a command of the numerical controller 150.

In the machining machine 210, a touch probe 240 which measures the machine coordinates of an arbitrary position in camera calibration processing is arranged at the tip end of the machining machine 210. The touch probe 240 acquires the machine coordinates of a point which is touched by a stylus sphere at the tip end of the probe. There is no limitation to this configuration, and a laser light source or the like may be arranged at the tip end of the machining machine 210.

For example, a movement mechanism is operated based on a command of the numerical controller 150, and thus the table 220 can be moved in each of the directions of the Xm axis and the Ym axis in the machine coordinate system Σm.

On the upper surface of the table 220, in the camera calibration processing, a checkerboard 250 serving as a calibration instrument is arranged in an arbitrary position seen from the camera 230 in an arbitrary posture. There is no limitation to this configuration, and on the table 220, a calibration instrument which has a plurality of feature points such as a dot pattern may be arranged. The checkerboard 250 is preferably arranged on the table 220 such that in the camera calibration processing, the touch probe 240 arranged at the tip end of the machining machine 210 can touch an arbitrary position on the checkerboard 250.

In FIG. 2, the checkerboard coordinate system Σb is set in the checkerboard 250. A lower left part of the checkerboard 250 is set to the origin of the checkerboard coordinate system Σb. A plurality of intersections (feature points) in the checkered pattern of the checkerboard 250 are previously stored in the storage unit 20 as positions in the checkerboard coordinate system Σb.

The camera 230 is a monocular digital camera which includes an image sensor such as a CCD (Charge Coupled Device) or a CMOS (Complementary Metal Oxide Semiconductor). The camera 230 is arranged in a position within the machine tool 200 in which the camera 230 does not interfere with the machining operation of the machining machine 210 and in which it is possible to monitor the state of a workpiece that is machined with the table 220 and the machining machine 210. In FIG. 2, the camera coordinate system Σc which is set in the camera 230 is shown.

In the camera calibration device 100, in order to calibrate the relationship between the machine coordinate system Σm set on the machine tool and the camera coordinate system Σc of the camera installed in the machine tool, the control unit 10 executes a program for the camera calibration processing stored in the storage unit 20. In this way, the control unit 10 functions as a machine coordinate measurement unit 11, an image acquisition unit 12 and a calibration unit 13.

The control unit 10 is, for example, a processor and controls the operations of the individual units of the camera calibration device 100. The control unit 10 also controls the operation of the machine tool 200 based on the camera calibration processing.

The machine coordinate measurement unit 11 receives, through the numerical controller 150, signals including the machine coordinates of a touch point touched by the touch probe 240 arranged in the machining machine 210 so as to acquire the touch point which is touched. The machine coordinate measurement unit 11 stores the machine coordinates of the touch point in the storage region of measurement value data 22 in the storage unit 20.

The image acquisition unit 12 acquires an image obtained by performing imaging with the camera 230. The image acquisition unit 12 stores the acquired image in the storage region of image data 21 in the storage unit 20.

The calibration unit 13 uses the acquired machine coordinates of the touch point and the image so as to calculate the posture R and the positional relationship t between the machine coordinate system Σm set on the machine tool 200 and the camera coordinate system Σc of the camera 230 installed in the machine tool.

The storage unit 20 is a hard disk device, a memory or the like, and stores the program for the camera calibration processing. The storage unit 20 includes the storage region of the image data 21 in which the image obtained by performing imaging with the camera 230 is stored, the storage region of the measurement value data 22 in which the machine coordinates of the touch point are stored and the storage region of calibration data 23 in which calibration data such as the posture R and the positional relationship t is stored.

The details of the operations of the control unit 10, the machine coordinate measurement unit 11, the image acquisition unit 12 and the calibration unit 13 will be described later.

<First Stage>

Figure 3:
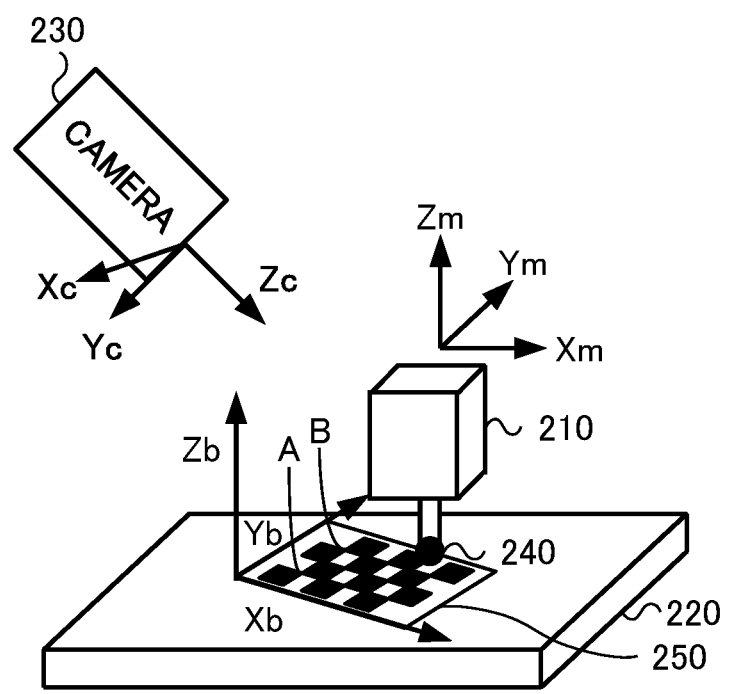
FIG. 3 is a diagram showing an example of the state of a table and a checkerboard when a touch probe touches the checkerboard.

For example, when an instruction is input by an operator or the like through an input unit such as a keyboard so as to perform the camera calibration processing, as shown in FIG. 3, the machine coordinate measurement unit 11 moves, through the numerical controller 150, the machining machine 210 in the negative direction (that is, the direction of the table 220) of the Zm axis in the machine coordinate system Σm. The machine coordinate measurement unit 11 makes the touch probe 240 touch an arbitrary position on the checkerboard 250. The machine coordinate measurement unit 11 receives, from the touch probe 240, signals including the machine coordinates of a touch point TP touched by the touch probe 240 so as to acquire the machine coordinates of the touch point TP. The machine coordinate measurement unit 11 stores the machine coordinates $(X_{tm}, Y_{tm}, Z_{tm})$ of the touch point TP in the machine coordinate system Σm as one point whose machine coordinates are known on the checkerboard 250 in the storage region of the measurement value data 22 in the storage unit 20.

FIG. 3 is a diagram showing an example of the state of table 220 and the checkerboard 250 when the touch probe 240 touches the checkerboard 250.

The image acquisition unit 12 outputs, to the camera 230, an imaging instruction to image the checkerboard 250 when the touch probe 240 touches the table 220. The image acquisition unit 12 acquires, from the camera 230, an image 300-1 of the touch probe 240 and the checkerboard 250 obtained by performing imaging with the camera 230 when the touch probe 240 touches the checkerboard 250. The image acquisition unit 12 stores the image 300-1 in the storage region of the image data 21 in the storage unit 20. Thereafter, the machine coordinate measurement unit 11 moves the machining machine 210 in the positive direction (that is, a direction away from the table 220) of the Zm axis so as to return the machining machine 210 to the original position.

Figure 4:
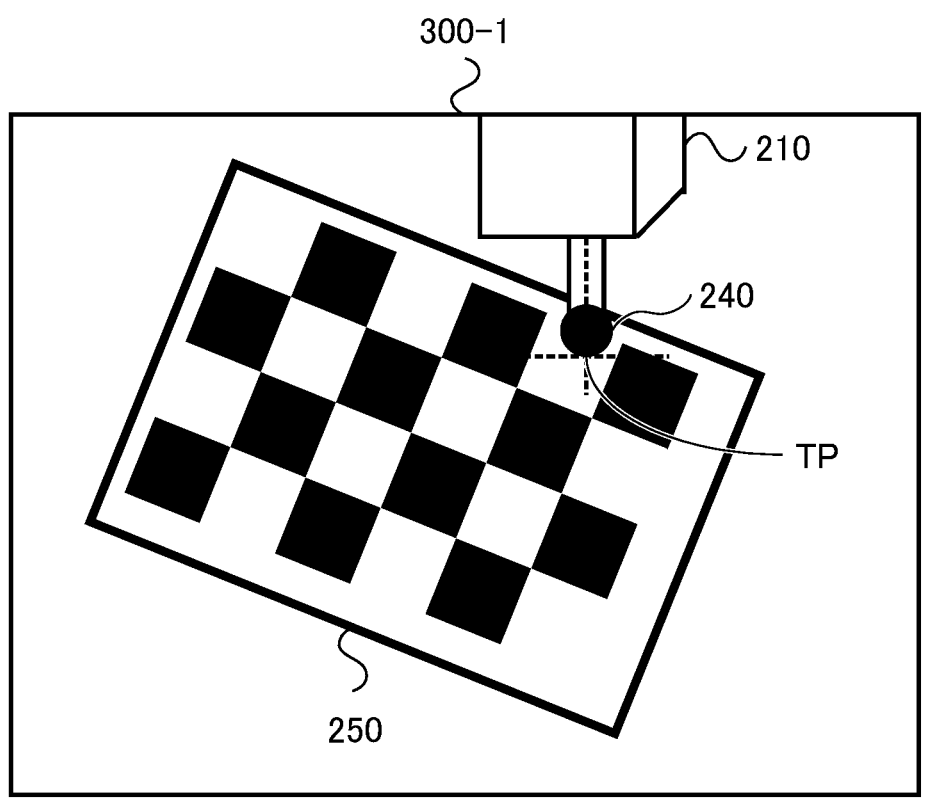
FIG. 4 is a diagram showing an example of an image of the checkerboard when the touch probe touches the checkerboard.

FIG. 4 is a diagram showing an example of the image 300-1 of the checkerboard 250 when the touch probe 240 touches the checkerboard 250. As shown in FIG. 4, in the image 300-1, not only the checkerboard 250 but also the tip end of the touch probe 240 is imaged.

As described previously, by the method known to a person skilled in the art (for example, the method of Tsai), the calibration unit 13 determines the internal parameter K of the camera and the posture $R_c$ and the positional relationship $t_c$ between the checkerboard coordinate system $\Sigma b$ and the camera coordinate system $\Sigma c$.

In this way, as indicated in formula (3), the point on the space represented by coordinates $(X_b, Y_b, Z_b)$ in the checkerboard coordinate system $\Sigma b$ is subjected to the linear transformation using formula (3), and can thereby be represented by coordinates $(X_c, Y_c, Z_c)$ in the camera coordinate system $\Sigma c$.

The internal parameter K of the camera is used, and thus it is possible to project the point on the space represented by coordinates $(X_b, Y_b, Z_b)$ in the checkerboard coordinate system $\Sigma b$ on (x, y) in the image coordinate system $\Sigma i$ by linear transformation.

A method of calculating the posture $R_c$ and the positional relationship $t_c$ between the checkerboard coordinate system $\Sigma b$ and the camera coordinate system $\Sigma c$ is not limited to the method of Tsai.

The calibration unit 13 may use, for example, a method known to a person skilled in the art on a PnP problem (Moreno-Noguer et al., "Accurate Non-Iterative O(n) Solution to the PnP Problem", Proceedings of the IEEE International Conference on Computer Vision (ICCV), October 2007) (hereinafter also referred to as the "Moreno-Noguer method") so as to calculate, from the image 300-1, the posture $R_c$ and the positional relationship $t_c$ between the checkerboard coordinate system $\Sigma b$ and the camera coordinate system $\Sigma_c$.

<Second Stage>

Figure 5:
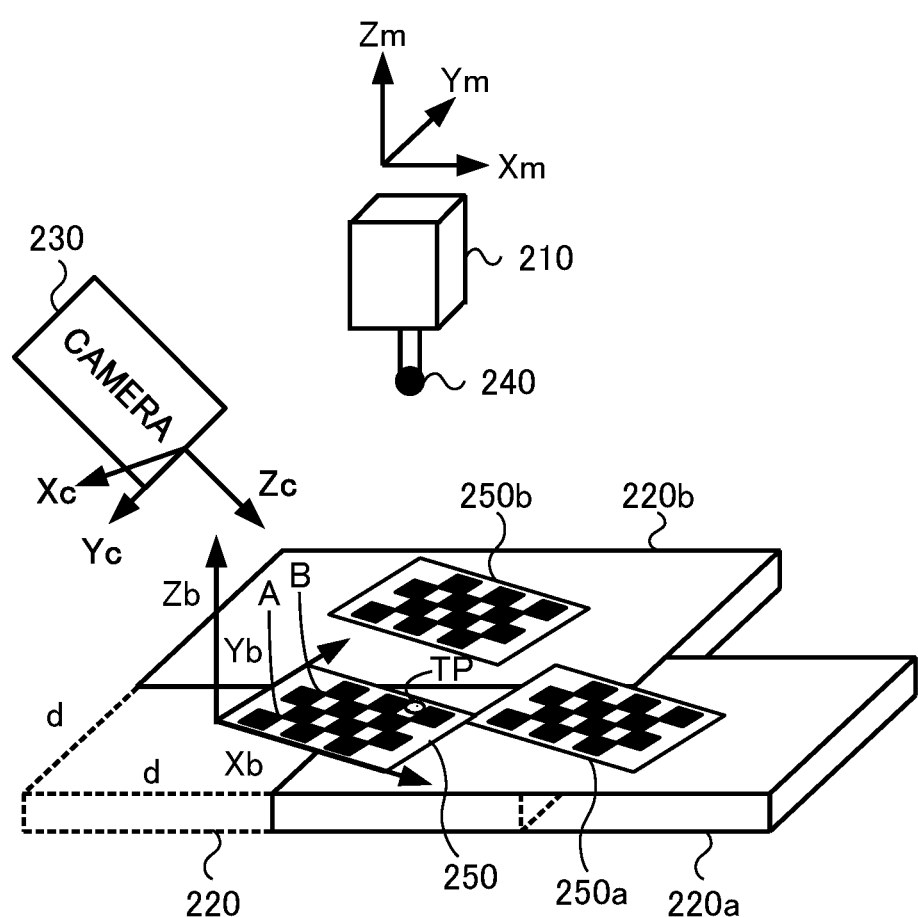
FIG. 5 is a diagram showing an example of the state of the table and the checkerboard which have been moved in each of the directions of an Xm axis and a Ym axis.

In the camera calibration processing, as shown in FIG. 5, the control unit 10 moves, through the numerical controller 150, the table 220 in each of the directions of the Xm axis and the Ym axis in the machine coordinate system $\Sigma m$ by the amount d of movement. The image acquisition unit 12 outputs an imaging instruction to image the state of the checkerboard 250 which has been moved in each of the directions.

FIG. 5 is a diagram showing an example of the state of the table 220 and the checkerboard 250 which have been moved in each of the directions of the Xm axis and the Ym axis. In FIG. 5, the table 220 which is located in the original position serving as a reference is indicated by broken lines. In FIG. 5, the tables 220 which have been moved in the individual directions of the Xm axis and the Ym axis by the amount d of movement are represented by tables 220a and 220b. In FIG. 5, the checkerboards 250 which have been moved in the individual directions of the Xm axis and the Ym axis are represented by checkerboards 250a and 250b. The touch point TP of the checkerboard 250 touched by the touch probe 240 is indicated by a shaded region.

More specifically, the control unit 10 moves the table 220 which is present in the original position (hereinafter also referred to as the "reference position") indicated by broken lines in the direction of the Xm axis by the amount d of movement. The image acquisition unit 12 outputs an imaging instruction to image the checkerboard 250a which has been moved. The image acquisition unit 12 acquires, from the camera 230, an image 300-2 of the checkerboard 250a obtained by performing imaging with the camera 230, and stores it in the storage region of the image data 21 in the storage unit 20. Thereafter, the control unit 10 moves the table 220 in the direction of the Xm axis by the amount of movement (−d) so as to return it to the reference position.

Then, the control unit 10 moves the table 220 present in the reference position in the direction of the Ym axis by the amount d of movement. The image acquisition unit 12 outputs, to the camera 230, an imaging instruction to image the checkerboard 250b which has been moved. The image acquisition unit 12 acquires, from the camera 230, an image 300-3 of the checkerboard 250b obtained by performing imaging with the camera 230, and stores it in the storage region of the image data 21 in the storage unit 20. Thereafter, the camera calibration device 100 moves the table 220 in the direction of the Ym axis only by the amount of movement (−d) so as to return it to the reference.

In the image 300-2 of the checkerboard 250a which has been moved in the direction of the Xm axis and the image 300-3 of the checkerboard 250b which has been moved in the direction of the Ym axis, the tip end of the touch probe 240 may not be imaged.

Then, in order to calculate the posture R of the camera coordinate system $\Sigma c$ with respect to the machine coordinate system $\Sigma m$, the calibration unit 13 reads the image 300-2 of the checkerboard 250a which has been moved in the direction of the Xm axis and the image 300-3 of the checkerboard 250b which has been moved in the direction of the Ym axis from the storage region of the image data 21 in the storage unit 20.

Figure 6:
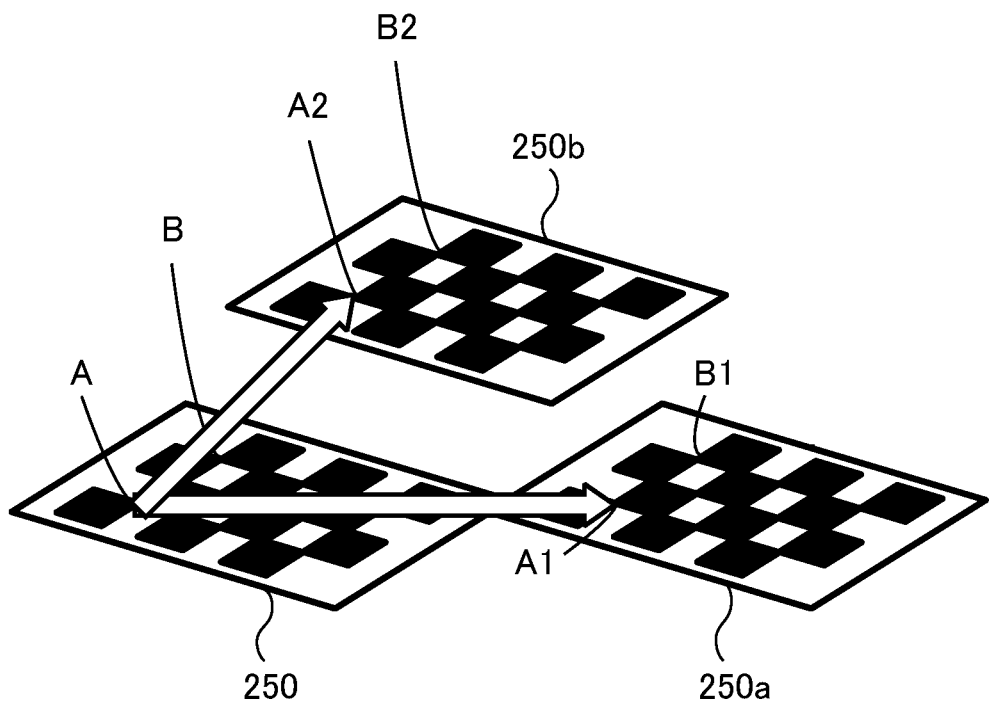
FIG. 6 is a diagram showing an example of a positional relationship between the checkerboards in three images.

FIG. 6 is a diagram showing an example of a positional relationship between the checkerboards 250, 250a and 250b in the three images 300-1, 300-2 and 300-3. In FIG. 6, the feature points of the checkerboard 250a which correspond to the feature points A and B of the checkerboard 250 are represented by A1 and B1, and the feature points of the checkerboard 250b are represented by A2 and B2.

As shown in FIG. 6, since the checkerboard 250a is the checkerboard 250 which has been moved in the direction of the Xm axis, a straight line between the feature point A and the feature point A1 indicated by an arrow indicates the direction of the Xm axis in the machine coordinate system $\Sigma m$. Likewise, a straight line between the feature point B and the feature point B1 indicates the direction of the Xm axis in the machine coordinate system $\Sigma m$. Then, the four feature points A, A1, B and B1 are pixels on the two-dimensional image coordinate system $\Sigma i$, and thus the straight line between the feature point A and the feature point A1 and the straight line between the feature point B and the feature point B1 intersect each other at a certain point, that is, a vanishing point $V_x$. Hence, the calibration unit 13 can calculate the vanishing point $V_x$ in the direction of the Xm axis in the machine coordinate system $\Sigma m$ from the coordinates of the feature points A, A1, B and B1 in the image coordinate system $\Sigma i$.

Since the checkerboard 250b is the checkerboard 250 which has been moved in the direction of the Ym axis, a straight line between the feature point A and a feature point A2 indicated by an arrow indicates the direction of the Ym axis in the machine coordinate system $\Sigma m$. Likewise, a straight line between the feature point B and a feature point B2 indicates the direction of the Ym axis in the machine coordinate system $\Sigma m$. Then, the four feature points A, A2, B and B2 are pixels on the two-dimensional image coordinate system $\Sigma i$, and thus the straight line between the feature point A and the feature point A2 and the straight line between the feature point B and the feature point B2 intersect each other at a certain point, that is, a vanishing point $V_y$. Hence, the calibration unit 13 can calculate the vanishing point $V_y$ in the direction of the Ym axis in the machine coordinate system Σm from the coordinates of the feature points A, A2, B and B2 in the image coordinate system Σi.

Hence, by a method of using a vanishing point known to a person skilled in the art, the calibration unit 13 can calculate, from the calculated vanishing points $V_x$ and $V_y$, and the internal parameter K, by use of formula (4), row vectors $r_x$, $r_y$, and $r_z$ forming the posture R of the camera coordinate system Σc with respect to the machine coordinate system Σm.

[Math. 4]

$$r_x = \frac{K^{-1}V_x}{\|K^{-1}V_x\|}, \quad r_y = \frac{K^{-1}V_y}{\|K^{-1}V_y\|}, \quad r_z = r_x \times r_y \tag{4}$$

In this way, as the second stage, the camera calibration device 100 uses the image 300-1 and the images 300-2 and 300-3 obtained by performing imaging when the machine tool makes linear axis movements in two directions, and thereby can determine the posture R of the camera coordinate system Σc with respect to the machine coordinate system Σm.

The posture $R_b$ of the checkerboard coordinate system Σb with respect to the machine coordinate system Σm can be calculated from a relationship of $R = R_c \cdot R_b$.

<Third Stage>

Then, in order to calculate the positional relationship t between the machine coordinate system Σm and the camera coordinate system Σc, the calibration unit 13 reads the machine coordinates of the touch point TP in the machine coordinate system Σm from the storage region of the measurement value data 22 in the storage unit 20. The calibration unit 13 uses the read machine coordinates of the touch point TP, the internal parameter K, the posture $R_c$, the positional relationship $t_c$ and the posture R so as to calculate the positional relationship t of the camera coordinate system Σc with respect to the machine coordinate system Σm.

More specifically, the calibration unit 13 first calculates, based on the relationship of $R = R_c \cdot R_b$, the posture $R_b$ of the checkerboard coordinate system Σb with respect to the machine coordinate system Σm.

The calibration unit 13 uses an image 300 shown in FIG. 4 so as to acquire an intersection of a straight line which passes through the center of the tip end of the touch probe 240, which is calculated from the image 300-1 and which is indicated by a broken line in the axial direction of the touch probe 240 and the circumference of the tip end of the touch probe 240 as the coordinates $(x_t, y_t)$ of the touch point TP in the image coordinate system Σi. Then, the calibration unit 13 uses formula (5) so as to convert the coordinates $(x_t, y_t)$ of the touch point TP in the image coordinate system Σi into the coordinates $(X_{tb}, Y_{tb}, Z_{tb})$ of the touch point TP in the checkerboard coordinate system Σb.

[Math. 5]

$$\begin{pmatrix} X_{tb} \\ Y_{tb} \\ Z_{tb} \end{pmatrix} = \alpha R_c^T K^{-1} \begin{pmatrix} x_t \\ y_t \\ 1 \end{pmatrix} - R_c^T t_c \tag{5}$$

Here, a scale α is calculated by $Z_{tb} = 0$.

The calibration unit 13 calculates, from the converted coordinates $(X_{tb}, Y_{tb}, Z_{tb})$ of the touch point TP in the checkerboard coordinate system Σb and the machine coordinates $(X_{tm}, Y_{tm}, Z_{tm})$ in the machine coordinate system Σm of the touch point TP stored in the storage region of the measurement value data 22 in the storage unit 20, by use of formula (6), a positional relationship $t_b$ of the checkerboard coordinate system Σb with respect to the machine coordinate system Σm.

[Math. 6]

$$\begin{pmatrix} X_{tb} \\ Y_{tb} \\ Z_{tb} \end{pmatrix} = R_b \begin{pmatrix} X_{tm} \\ Y_{tm} \\ Z_{tm} \end{pmatrix} + t_b \tag{6}$$

Then, the calibration unit 13 uses formula (7) so as to calculate the positional relationship t of the camera coordinate system Σc with respect to the machine coordinate system Σm.

$$t = R_c \cdot t_b + t_c \tag{7}$$

The calibration unit 13 stores the calculated positional relationship t in the storage region of the calibration data 23 in the storage unit 20.

In this way, as the third stage, the camera calibration device 100 can determine the positional relationship t between the machine coordinate system Σm and the camera coordinate system Σc.

The configuration of the camera calibration device 100 according to the first embodiment has been described above.

The operation of the camera calibration device 100 will then be described with reference to a flowchart shown in FIG. 7.

Figure 7:
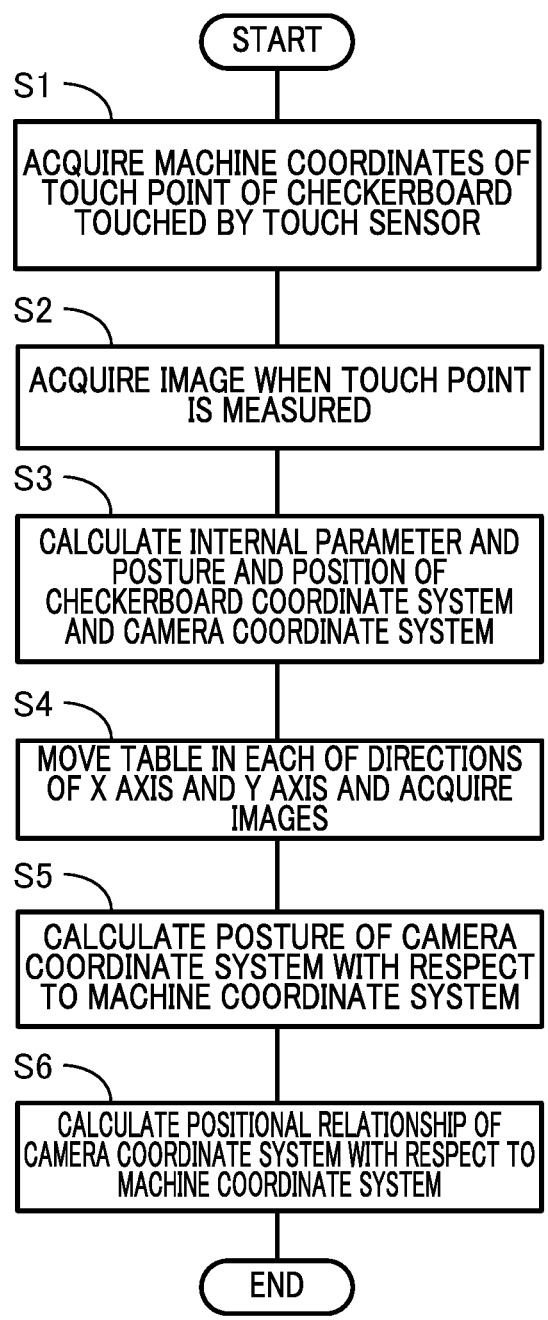
FIG. 7 is a diagram showing an example of camera calibration processing in the camera calibration device according to the first embodiment.

FIG. 7 is a diagram showing an example of the camera calibration processing in the camera calibration device 100 according to the first embodiment. The processing shown in FIG. 7 is performed, for example, by the operation of the input device of the camera calibration device 100 by the operator or the like. When the processing shown in FIG. 7 is performed, the operator or the like arranges, as shown in FIG. 2, the checkerboard 250 in an arbitrary position of the table 220 in an arbitrary posture.

In step S1, as shown in FIG. 3, the machine coordinate measurement unit 11 moves the machining machine 210 in the negative direction (that is, the direction of the table 220) of the Zm axis in the machine coordinate system Σm so as to make the touch probe 240 touch the checkerboard 250. The machine coordinate measurement unit 11 acquires the machine coordinates of the touch point TP touched by the touch probe 240.

In step S2, the image acquisition unit 12 acquires, from the camera 230, the image 300-1 of the touch probe 240 and the checkerboard 250 obtained by performing imaging with the camera 230.

In step S3, for example, by the method of Tsai, the calibration unit 13 calculates, from the image 300-1 acquired in step S2, the internal parameter K and the posture $R_c$ and the positional relationship $t_c$ of the camera coordinate system Σc with respect to the checkerboard coordinate system Σb.

In step S4, as shown in FIG. 5, the control unit 10 moves the table 220 present in the reference position in each of the directions of the Xm axis and the Ym axis in the machine coordinate system Σm by the amount d of movement. The image acquisition unit 12 acquires the image 300-2 of the checkerboard 250a which has been moved in the direction of the Xm axis and the image 300-3 of the checkerboard 250*b* which has been moved in the direction of the Ym axis.

In step S5, the calibration unit 13 uses the images 300-2 and 300-3 so as to calculate the vanishing points $V_x$ and $V_y$ in the directions of the Xm axis and the Ym axis in the machine coordinate system Σm. The calibration unit 13 uses formula (4) so as to calculate, from the calculated vanishing points $V_x$ and $V_y$, the posture R of the camera coordinate system Σc with respect to the machine coordinate system Σm.

In step S6, the calibration unit 13 uses formulas (5) to (7) so as to calculate, from the machine coordinates ($X_{tm}$, $Y_{tm}$, $Z_{tm}$) of the touch point TP in the machine coordinate system Σm and the coordinates ($x_t$, $y_t$) of the touch point TP of the image 300-1 in the image coordinate system Σi, the positional relationship t of the camera coordinate system Σc with respect to the machine coordinate system Σm.

As described above, in the first embodiment, the camera calibration device 100 acquires the machine coordinates of the touch point TP at which the checkerboard 250 arranged in an arbitrary position of the table 220 in an arbitrary posture is touched by the touch probe 240 arranged in the machining machine 210. Then, the camera calibration device 100 acquires the image 300-1 of the touch probe 240 and the checkerboard 250 when the touch probe 240 touches the touch point TP. The camera calibration device 100 moves the table 220 in each of the directions of the Xm axis and the Ym axis in the machine coordinate system Σm so as to acquire the images 300-2 and 300-3 of the checkerboard 250 when the table 220 is moved in the individual directions. The camera calibration device 100 calculates the posture R and the positional relationship t of the camera coordinate system Σc with respect to the machine coordinate system Σm based on the positional relationship between a plurality of feature points in the checkerboards 250 in the acquired three images 300-1, 300-2 and 300-3 through the checkerboard coordinate system Σb.

In this way, the camera calibration device 100 arranges the checkerboard 250 in an arbitrary position of the table 220 in an arbitrary posture so as to be able to easily calibrate, even in the machine tool whose flexibility is low, the relationship between the machine coordinate system Σm set on the machine tool and the camera coordinate system Σc of the camera installed in the machine tool. In the camera calibration device 100, an operation of installing a dedicated calibration instrument in a specified position and a jig for installing the calibration instrument are not needed, and thus it is possible to reduce an operational burden and a facility burden placed on the camera calibration.

The first embodiment has been described above.

Variation 1 of First Embodiment

Although the camera calibration device 100 according to the first embodiment uses the three images of the image 300-1 of the checkerboard 250 which is present in the reference position, the image 300-2 of the checkerboard 250*a* which has been moved in the direction of the Xm axis and the image 300-3 of the checkerboard 250*b* which has been moved in the direction of the Ym axis so as to calculate the posture R of the camera coordinate system Σc with respect to the machine coordinate system Σm from variations in the positions of a plurality of feature points such as the feature points A and B, there is no limitation to this configuration. For example, as a variation 1 of the first embodiment, the camera calibration device 100 may calculate the posture R from a variation in the position of one feature point.

In this case, the camera calibration device 100 needs to move the table 220 together with the images 300-1, 300-2 and 300-3 in the direction of the Xm axis by the amount d of movement and to acquire an image 300-4 which has been moved in the direction of the Ym axis by the amount d of movement. In other words, the camera calibration device 100 uses the four images so as to be able to calculate the posture R from a variation in the position of one feature point without a solution being indefinite.

Variation 2 of First Embodiment

Although in the camera calibration device 100 according to the first embodiment, an XmYm plane in the machine coordinate system Σm and an XbYb plane in the checkerboard coordinate system Σb are not necessarily parallel to each other, and thus the table 220 is moved in each of the directions of the Xm axis and the Ym axis, there is no limitation to this configuration. For example, as a variation 2 of the first embodiment, in the camera calibration device 100, when the XmYm plane in the machine coordinate system Σm and the XbYb plane in the checkerboard coordinate system Σb are parallel to each other, the table 220 may be moved only in any one of the directions of the Xm axis and the Ym axis.

In this case, the camera calibration device 100 can directly determine a straight line between the feature point A and the feature point A1 on a plane obtained by performing reverse transformation on the internal parameter K and the posture $R_c$ with respect to an image plane and the posture $R_b$ in the rotative movement of the Xb axis in the checkerboard coordinate system Σb. The posture R in this case is calculated by $R = R_b \cdot R_c$.

Second Embodiment

A second embodiment will then be described. The second embodiment differs from the first embodiment in that the camera calibration device uses, instead of the checkerboard, a groove, a scratch, a pattern, a corner point or the like on the table as a pattern including a plurality of feature points used for calibration.

In this way, in the first stage of the second embodiment, a camera calibration device 100A acquires an image obtained by imaging one point whose machine coordinates are known and a plurality of feature points.

Then, as the second stage, as will be described later, the camera calibration device 100A uses the coordinates in the image coordinate system Σi of a plurality of feature points in each of an image obtained by imaging one point whose machine coordinates are known and a plurality of feature points and an image obtained by performing imaging when the machine tool makes linear axis movements in two directions so as to determine, as in the first embodiment, by a method of using a vanishing point, the posture R of the camera coordinate system Σc with respect to the machine coordinate system Σm.

Furthermore, as the third stage, as will be described later, the camera calibration device 100A uses one point whose machine coordinates are known, an image obtained by imaging the one known point, an image obtained by performing imaging when the machine tool makes linear axis movements in two directions and the posture R of the camera coordinate system Σc with respect to the machine coordinate system Σm so as to calculate the posture $R_t$ and a positional relationship $t_t$ of a table coordinate system Σt with respect to the machine coordinate system Σm. In this way, the camera calibration device 100A can determine the positional relationship t of the camera coordinate system Σc with respect to the machine coordinate system Σm.

In the second embodiment, the camera calibration device 100A previously calculates, before the camera calibration processing, by a known method, the internal parameter K and the distortion aberration coefficients $_{k1}$ and $_{k2}$ so as to store, in the storage unit 20, the internal parameter K and the distortion aberration coefficients $_{k1}$ and $_{k2}$ which are calculated.

In this way, the camera calibration device 100A can calibrate the relationship between the machine coordinate system Σm set on the machine tool and the camera coordinate system Σc of the camera installed in the machine tool. The second embodiment will be described below.

Figure 8:
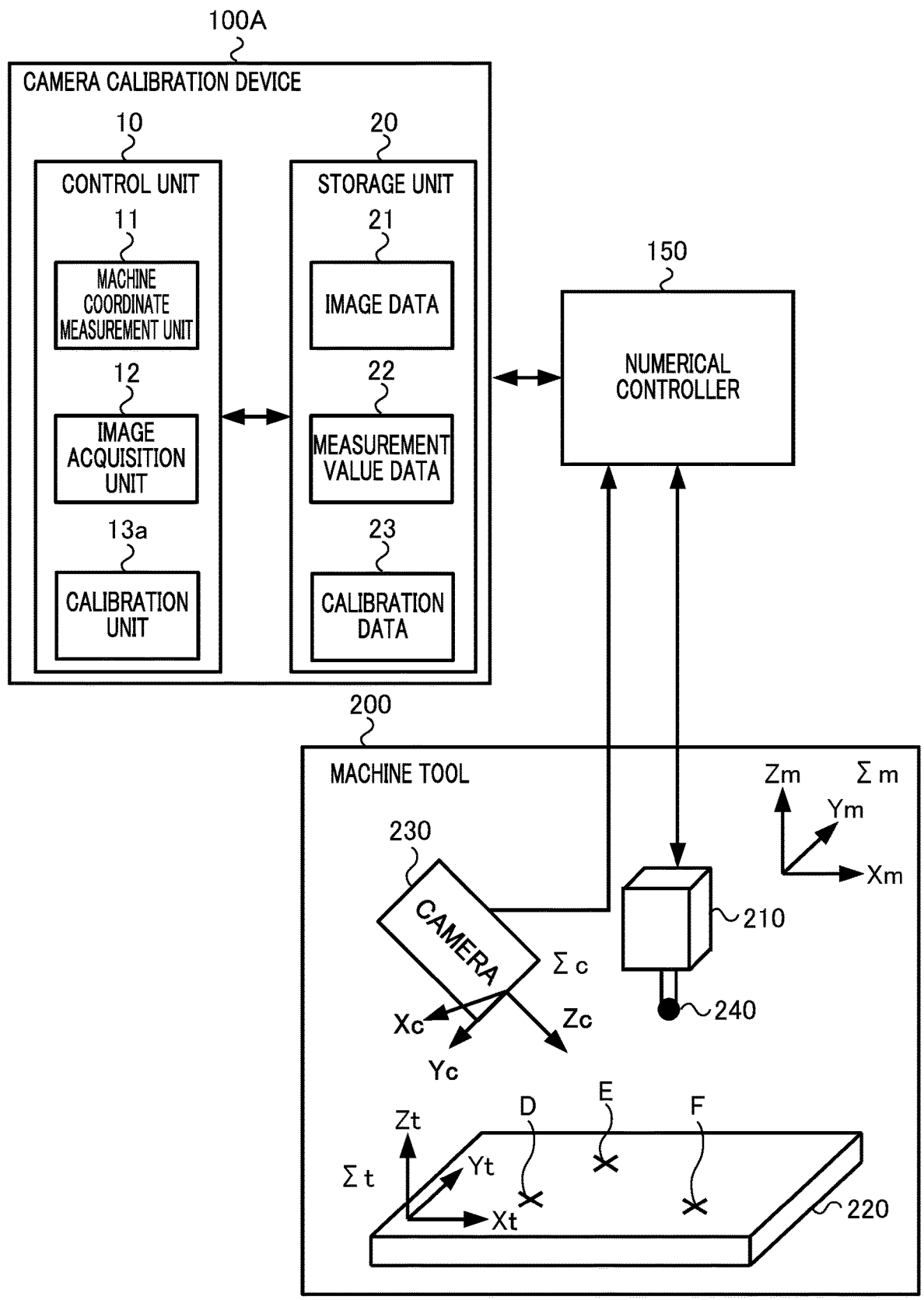
FIG. 8 is a diagram showing an example of a camera calibration device according to a second embodiment of the present invention.

FIG. 8 is a diagram showing an example of the camera calibration device according to the second embodiment of the present invention. In FIG. 8, elements which have the same functions as the elements of the camera calibration device 100 according to the first embodiment are identified with the same reference numerals, and the detailed descriptions thereof will be omitted.

The camera calibration device 100A according to the second embodiment has the same configuration as the camera calibration device 100 according to the first embodiment.

As shown in FIG. 8, in the table 220, the table coordinate system Σt is set.

In the camera calibration device 100A, in order to calibrate the relationship between the machine coordinate system Σm set on the machine tool and the camera coordinate system sc of the camera installed in the machine tool, the control unit 10 executes the program for the camera calibration processing stored in the storage unit 20. In this way, the control unit 10 functions as the machine coordinate measurement unit 11, the image acquisition unit 12 and a calibration unit 13a.

The machine coordinate measurement unit 11 and the image acquisition unit 12 have the same functions as the machine coordinate measurement unit 11 and the image acquisition unit 12 in the first embodiment.

The calibration unit 13a uses the machine coordinates of the touch point TP and images which are acquired so as to calculate the posture R and the positional relationship t between the machine coordinate system Σm set on the machine tool 200 and the camera coordinate system Σc of the camera 230 installed in the machine tool.

<First Stage>

For example, the machine coordinate measurement unit 11 makes the touch probe 240 touch an arbitrary position on the table 220 so as to acquire the machine coordinates of the touch point TP touched by the touch probe 240. The image acquisition unit 12 acquires an image 300a-1 of the table 220 when the touch probe 240 touches the table 220.

<Second Stage>

Figure 9:
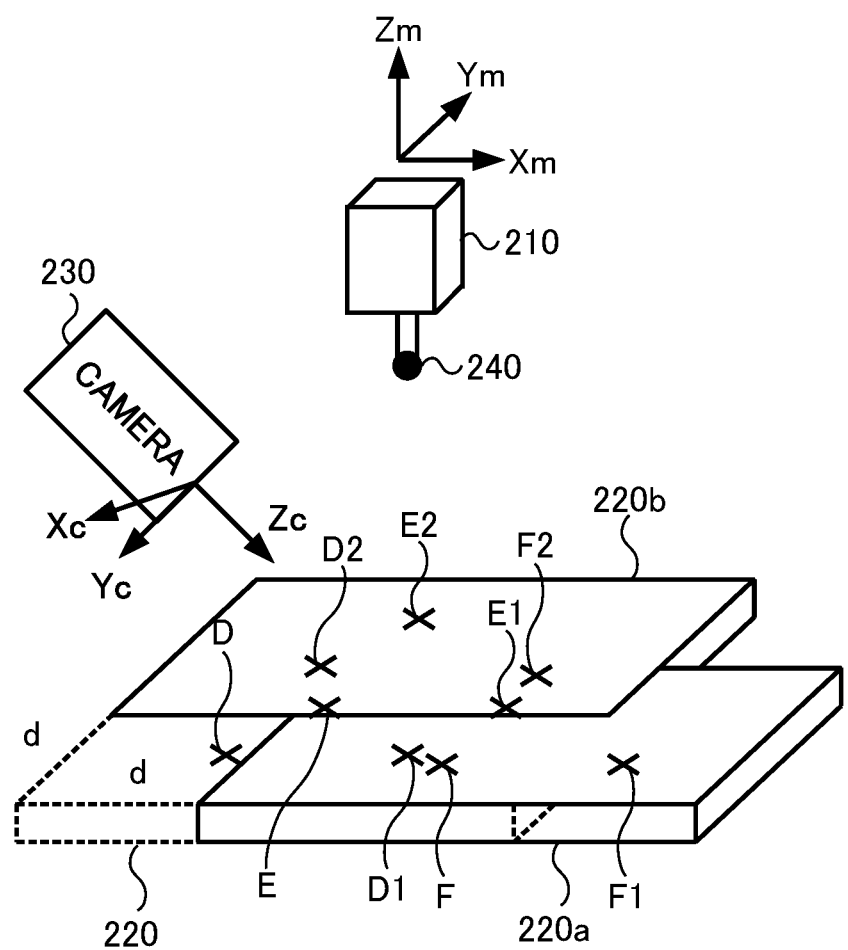
FIG. 9 is a diagram showing an example of a table which has been moved in each of the directions of the Xm axis and the Ym axis.

In the camera calibration processing, as shown in FIG. 9, the control unit 10 moves the table 220 in each of the directions of the Xm axis and the Ym axis in the machine coordinate system Σm by the amount d of movement. The image acquisition unit 12 acquires an image 300a-2 of a table 220a which has been moved in the direction of the Xm axis and an image 300a-3 of a table 220b which has been moved in the direction of the Ym axis.

FIG. 9 is a diagram showing an example of the table 220 which has been moved in each of the directions of the Xm axis and the Ym axis. In FIG. 9, as in FIG. 5, the table 220 which is present in the reference position is indicated by broken lines. In FIG. 9, the tables 220 which have been moved in the individual directions of the Xm axis and the Ym axis by the amount d of movement are represented by the tables 220a and 220b. In FIG. 9, feature points D, E and F which have been moved in the individual directions of the Xm axis and the Ym axis are represented by feature points D1, E1 and F1 and feature points D2, E2 and F2.

Then, the calibration unit 13a performs image processing such as edge detection processing known to a person skilled in the art on the images 300a-1, 300a-2 and 300a-3 so as to detect a plurality of feature points such as a scratch, a pattern and a corner point seen from the camera 230. The calibration unit 13a acquires the coordinates in the image coordinate system Σi of a plurality of feature points which are detected. For example, the calibration unit 13a acquires, from the image 300a-1, the coordinates of the feature points D, E and F in the image coordinate system Σi. The calibration unit 13a also acquires, from the image 300a-2, the coordinates of the feature points D1, E1 and F1 in the image coordinate system Σi. The calibration unit 13a also acquires, from the image 300a-2, the coordinates of the feature points D2, E2 and F2 in the image coordinate system Σi.

Since as shown in FIG. 9, the table 220a is the table 220 which has been moved in the direction of the Xm axis, a straight line between the feature point D and the feature point D1 indicates the direction of the Xm axis in the machine coordinate system Σm. Likewise, a straight line between the feature point E and the feature point E1 and a straight line between the feature point F and the feature point F1 indicate the direction of the Xm axis in the machine coordinate system Σm. Then, the six feature points D, E, F, D1, E1 and F1 are pixels on the two-dimensional image coordinate system Σi, and thus the straight line between the feature point D and the feature point D1, the straight line between the feature point E and the feature point E1 and the straight line between the feature point F and F1 intersect each other at a certain point, that is, a vanishing point $V_x$. Hence, the calibration unit 13a can calculate, from the coordinates of the feature points D, E and F and the feature points D1, E1 and F1 in the image coordinate system Σi, the vanishing point $V_x$ in the direction of the Xm axis in the machine coordinate system Σm.

Since the table 220b is the table 220 which has been moved in the direction of the Ym axis, a straight line between the feature point D and the feature point D2 indicates the direction of the Ym axis in the machine coordinate system Σm. Likewise, a straight line between the feature point E and the feature point E2, and a straight line between the feature point F and the feature point F2 indicate the direction of the Ym axis in the machine coordinate system Σm. Then, the six feature points D, E, F, D2, E2 and F2 are pixels on the two-dimensional image coordinate system Σi, and thus the straight line between the feature point D and the feature point D2, the straight line between the feature point E and the feature point E2 and the straight line between the feature point F and F2 intersect each other at a certain point, that is, a vanishing point $V_y$. Hence, the calibration unit 13a can calculate, from the coordinates of the feature points D, E and F and the feature points D2, E2 and F2 in the image coordinate system Σi, the vanishing point $V_y$ in the direction of the Ym axis in the machine coordinate system Σm.

Hence, the calibration unit 13a can calculate, from the calculated vanishing points $V_x$ and $V_y$ and the internal parameter K, by use of formula (4), row vectors $r_x$, $r_y$ and $r_z$ forming the posture R of the camera coordinate system Σc with respect to the machine coordinate system Σm.

<Third Stage>

The calibration unit 13a calculates positional relationships $t_D$, $t_E$ and $t_F$ between the coordinate system of three planes of the plane of the feature points D, D1 and D2, the plane of the feature points E, E1 and E2 and the plane of the feature points F, F1 and F2 shown in FIG. 9 and the camera coordinate system Σc. Although a description will be given of a case where the positional relationship $t_D$ is calculated, the positional relationships $t_E$ and $t_F$ are likewise calculated.

Here, the feature points D1, E1 and F1 are the feature points D, E and F which have been moved in the direction of the Xm axis, and the feature points D2, E2 and F2 are the feature points D, E and F which have been moved in the direction of the Ym axis. Hence, the plane of the feature points D, D1 and D2, the plane of the feature points E, E1 and E2 and the plane of the feature points F, F1 and F2 are planes which are parallel to the XmYm plane in the machine coordinate system Σm. However, as long as the plane on the table 220 is not parallel to the XmYm plane in the machine coordinate system Σm, the plane of the feature points D, D1 and D2, the plane of the feature points E, E1 and E2 and the plane of the feature points F, F1 and F2 differ from each other in the position in the direction of the Zm axis.

Hence, in the calibration unit 13a, when the feature point D is assumed to be a temporary origin (0, 0, 0) in the machine coordinate system Σm, the machine coordinates of the feature point D1 is (d, 0, 0), and the machine coordinates of the feature point D2 is (0, d, 0). In this case, the machine coordinates (0, 0, 0), (d, 0, 0) and (0, d, 0) of the feature points D, D1 and D2 and the machine coordinates $(x_D, y_D)$, $(x_{D1}, y_{D1})$ and $(x_{D2}, y_{D2})$ of the feature points D, D1 and D2 in the image coordinate system Σi are associated with each other as indicated in formula (8). Here, scales a, Q and y and the positional relationship $t_D$ are unknown numbers. The left side of formula (8) is obtained by converting the coordinates of the feature points D, D1 and D2 in the image coordinate system Σi into coordinates in the camera coordinate system Σc.

[Math. 7]

$$\alpha K^{-1} \begin{pmatrix} x_D \\ y_D \\ 1 \end{pmatrix} = R \begin{pmatrix} 0 \\ 0 \\ 0 \end{pmatrix} + t_D \quad (8)$$

$$\beta K^{-1} \begin{pmatrix} x_{D1} \\ y_{D1} \\ 1 \end{pmatrix} = R \begin{pmatrix} d \\ 0 \\ 0 \end{pmatrix} + t_D$$

$$\gamma K^{-1} \begin{pmatrix} x_{D2} \\ y_{D2} \\ 1 \end{pmatrix} = R \begin{pmatrix} 0 \\ d \\ 0 \end{pmatrix} + t_D$$

The calibration unit 13a calculates, from formula (8), the positional relationship $t_D$ of the camera coordinate system Σc with respect to the plane of the feature points D, D1 and D2. Likewise, the calibration unit 13a calculates the positional relationship $t_E$ of the camera coordinate system Σc with respect to the plane of the feature points E, E1 and E2 and the positional relationship $t_F$ of the camera coordinate system Σc with respect to the plane of the feature points F, F1 and F2. Then, when the calibration unit 13a assumes that the coordinate origin of the table coordinate system Σt set in the table 220 is the position of the feature point D, and defines the direction of an Xt axis as $t_X = t_D - t_E$, the direction of a Zt axis is $t_z = (t_D - t_E) \times (t_D - t_F)$. Here, the direction of a Yt axis is $t_y = t_z \times t_x$. In this way, the calibration unit 13a can calculate the posture $R_t$ of the table coordinate system Σt with respect to the machine coordinate system Σm. Then, the calibration unit 13a can calculate, from the relationship of $R = R_c \cdot R_t$, the posture $R_c$ of the camera coordinate system Σc with respect to the table coordinate system Σt.

The calibration unit 13a uses an image 330a-1 obtained by performing imaging when the touch probe 240 touches the table 220 so as to acquire, as in the case of FIG. 4, the coordinates $(x_t, y_t)$ of the touch point TP in the image coordinate system Σi. The calibration unit 13a uses formula (9) so as to convert the coordinates $(x_t, y_t)$ of the touch point TP in the image coordinate system Σi into the coordinates $(X_{tb}, Y_{tb}, Z_{tb})$ of the touch point TP in the checkerboard coordinate system Σb.

[Math. 8]

$$\begin{pmatrix} X_{tb} \\ Y_{tb} \\ Z_{tb} \end{pmatrix} = \alpha R_c^T K^{-1} \begin{pmatrix} x_t \\ y_t \\ 1 \end{pmatrix} - R_c^T t_D \quad (9)$$

Here, a scale α is calculated by $Z_{tb}=0$.

The calibration unit 13a calculates, from the converted coordinates $(X_{tb}, Y_{tb}, Z_{tb})$ of the touch point TP in the table coordinate system Σt and the machine coordinates $(X_{tm}, Y_{tm}, Z_{tm})$ in the machine coordinate system Σm of the touch point TP stored in the storage region of the measurement value data 22 in the storage unit 20, by use of formula (10), the positional relationship $t_t$ of the table coordinate system Σt with respect to the machine coordinate system Σm.

[Math. 9]

$$\begin{pmatrix} X_{tb} \\ Y_{tb} \\ Z_{tb} \end{pmatrix} = R_t \begin{pmatrix} X_{tm} \\ Y_{tm} \\ Z_{tm} \end{pmatrix} + t_t \quad (10)$$

Then, the calibration unit 13a uses formula (11) so as to calculate the positional relationship t of the camera coordinate system Σc with respect to the machine coordinate system Σm.

$$t = R_c \cdot t_t + t_D \quad (11)$$

The calibration unit 13a stores the calculated positional relationship t in the storage region of the calibration data 23 in the storage unit 20. In this way, as the third stage, the camera calibration device 100A can determine the positional relationship t of the camera coordinate system Σc with respect to the machine coordinate system Σm.

The configuration of the camera calibration device 100A according to the second embodiment has been described above.

The operation of the camera calibration device 100A will then be described with reference to a flowchart shown in FIG. 10.

Figure 10:
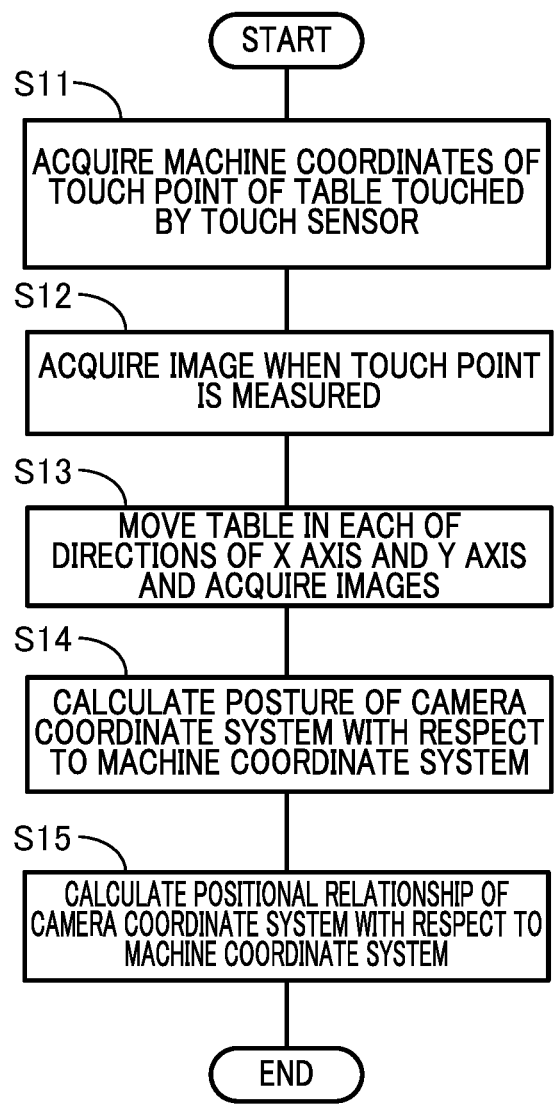
FIG. 10 is a diagram showing an example of camera calibration processing in the camera calibration device according to the second embodiment.

FIG. 10 is a diagram showing an example of the camera calibration processing in the camera calibration device 100A according to the second embodiment. The processing shown in FIG. 10 differs from the processing of the first embodiment shown in FIG. 7 in that a plurality of feature points D, E and F are used as checkerboards.

The processing shown in FIG. 10 is performed, for example, by the operation of the input device of the camera calibration device 100A by the operator or the like.

In step S11, the machine coordinate measurement unit 11 moves the machining machine 210 in the negative direction (that is, the direction of the table 220) of the Zm axis in the machine coordinate system Σm so as to make the touch probe 240 touch the table 220. The machine coordinate measurement unit 11 acquires the machine coordinates of the touch point TP touched by the touch probe 240.

In step S12, the image acquisition unit 12 acquires, from the camera 230, the image 300a-1 of the touch probe 240 and the table 220 obtained by performing imaging with the camera 230.

In step S13, as shown in FIG. 9, the control unit 10 moves the table 220 present in the reference position in each of the directions of the Xm axis and the Ym axis in the machine coordinate system Σm by the amount d of movement. The image acquisition unit 12 acquires the image 300a-2 of the table 220a which has been moved in the direction of the Xm axis and the image 300a-3 of the table 220b which has been moved in the direction of the Ym axis.

In step S14, the calibration unit 13a uses the feature points D, E and F of the image 300a-1, the feature points D1, E1 and F1 of the image 300a-2 and the feature points D2, E2 and F2 of the image 300a-3 so as to calculate the vanishing points $V_x$ and $V_y$ in the directions of the Xm axis and the Ym axis in the machine coordinate system Σm. The calibration unit 13a uses formula (4) so as to calculate, from the calculated vanishing points $V_x$ and $V_y$, the posture R of the camera coordinate system Σc with respect to the machine coordinate system Σm.

In step S15, the calibration unit 13a uses formulas (8) to (11) so as to calculate, from the machine coordinates ($X_{tm}$, $Y_{tm}$, $Z_{tm}$) of the touch point TP in the machine coordinate system Σm and the coordinates ($x_t$, $y_t$) of the touch point TP of the image 300a-1 in the image coordinate system Σi, the positional relationship t of the camera coordinate system Σc with respect to the machine coordinate system Σm. The calibration unit 13a stores the calculated positional relationship t in the storage region of the calibration data 23 in the storage unit 20.

As described above, in the second embodiment, the camera calibration device 100A acquires the machine coordinates of the touch point TP at which the touch probe 240 arranged in the machining machine 210 touches the table 220 and the image 300a-1 of the table 220 when the touch probe 240 touches the table 220. The camera calibration device 100A also acquires the images 300a-2 and 300a-3 of the table 220 when the table 220 has been moved in each of the directions of the Xm axis and the Ym axis in the machine coordinate system Σm. The camera calibration device 100A calculates the posture R and the positional relationship t of the camera coordinate system Zc with respect to the machine coordinate system Σm based on the positional relationship between a plurality of feature points on the tables 220 in the acquired three images 300a-1, 300a-2 and 300a-3 through the table coordinate system Σt.

In this way, the camera calibration device 100A uses a plurality of feature points on the table 220 as the calibration instrument so as to be able to easily calibrate, even in the machine tool whose flexibility is low, the relationship between the machine coordinate system Σm set on the machine tool and the camera coordinate system Σc of the camera installed in the machine tool. In the camera calibration device 100A, an operation of installing a dedicated calibration instrument in a specified position and a jig for installing the calibration instrument are not needed, and thus it is possible to reduce an operational burden and a facility burden placed on the camera calibration.

The second embodiment has been described above.

Variation 1 of Second Embodiment

Although the camera calibration device 100A according to the second embodiment previously calculates, by a known method, the internal parameter K and the distortion aberration coefficients $_{k1}$ and $_{k2}$ so as to store them in the storage unit 20, there is no limitation to this configuration. For example, as a variation 1 of the second embodiment, the camera calibration device 100A may assume a plurality of feature points such as a scratch on the table 220 as checkerboards so as to calculate the internal parameter K and the distortion aberration coefficients $_{k1}$ and $_{k2}$ by a known method.

In this case, the camera calibration device 100A preferably acquires three or more images obtained by moving the table 220 to various positions on the XmYm plane in the machine coordinate system Σm.

Variation 2 of Second Embodiment

Although the camera calibration device 100A according to the second embodiment detects a plurality of feature points D, E and F on the table 220, there is no limitation to this configuration. For example, as a variation 2 of the second embodiment, when the XmYm plane in the machine coordinate system Σm and an XtYt plane in the table coordinate system Σt are parallel to each other, the camera calibration device 100A may use only one feature point.

Third Embodiment

A third embodiment will then be described. The third embodiment differs from the first embodiment in that the camera calibration device uses a 3D camera as the camera included in the machine tool. In this way, in the third embodiment, since the camera calibration device can directly acquire the position of the tip end of the touch probe 240 seen from the camera coordinate system Σc, when the machine coordinates of the tip end of the touch probe 240 are known, the operation of touching the checkerboard 250 is not needed. Hence, in the following description, instead of the touch point, the position of the tip end of the touch probe 240 is also referred to as the "tip end position".

Hence, in the third stage of the third embodiment, the machine coordinates ($X_{tm}$, $Y_{tm}$, $Z_{tm}$) of the tip end position in the machine coordinate system Σm and the coordinates ($X_{tc}$, $Y_{tc}$, $Z_{tc}$) in the camera coordinate system Σc are associated with each other as indicated in formula (12). Hence, the camera calibration device 100B can determine, without the intervention of the checkerboard coordinate system Σb, the positional relationship t of the camera coordinate system Σc with respect to the machine coordinate system Σm.

[Math. 10]

$$\begin{pmatrix} X_{tc} \\ Y_{tc} \\ Z_{tc} \end{pmatrix} = R \begin{pmatrix} X_{tm} \\ Y_{tm} \\ Z_{tm} \end{pmatrix} + t \quad (12)$$

As the first stage, the camera calibration device 100B acquires an image 300b-1 of the checkerboard 250 installed in an arbitrary position on the table 220 including the touch probe 240. By a known method, the camera calibration device 100B determines, from the acquired image, the internal parameter of the camera and the posture $R_4$ and the positional relationship $t_c$ of the camera coordinate system Σc with respect to the checkerboard coordinate system Σb.

As in the first embodiment, as the second stage, the camera calibration device 100B uses an image 300b-2 of the checkerboard 250a which has been moved in the direction of the Xm axis in the machine coordinate system Σm and an image 300b-3 of the checkerboard 250b which has been moved in the direction of the Ym axis so as to determine the posture R of the camera coordinate system Σc with respect to the machine coordinate system Σm.

In this way, the camera calibration device 100B can calibrate the relationship between the machine coordinate system Σm set on the machine tool and the camera coordinate system sc of the camera installed in the machine tool.

The third embodiment will be described below.

Figure 11:
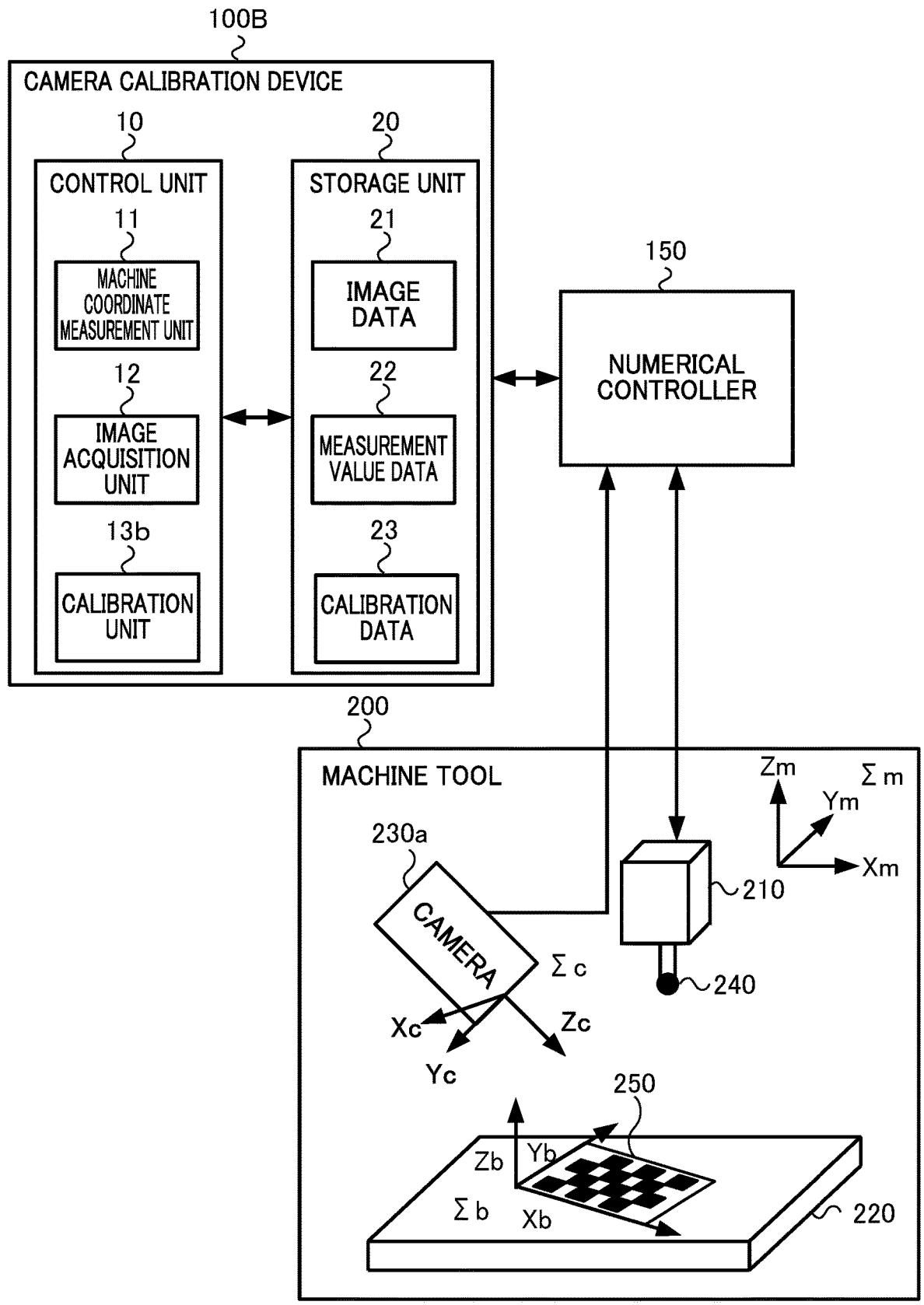
FIG. 11 is a diagram showing an example of a camera calibration device according to a third embodiment of the present invention.

FIG. 11 is a diagram showing an example of the camera calibration device according to the third embodiment of the present invention. In FIG. 11, elements which have the same functions as the elements of the camera calibration device 100 according to the first embodiment are identified with the same reference numerals, and the detailed descriptions thereof will be omitted.

The camera calibration device 100B according to the third embodiment has the same configuration as the camera calibration device 100 according to the first embodiment.

The machine tool 200 includes the machining machine 210, the table 220 and a camera 230a.

The camera 230a is a 3D camera (for example, a stereo camera or a depth camera) which includes two image sensors such as a CCD and a CMOS. The camera 230a is arranged in a position within the machine tool 200 in which the camera 230a does not interfere with the machining operation of the machining machine 210 and in which it is possible to observe the state of a workpiece that is machined with the table 220 and the machining machine 210. A baseline length and the like in the camera 230a are previously calibrated, and calibration data of the baseline length and the like is stored in the storage region of the calibration data 23 in the storage unit 20.

In the camera calibration device 100B, in order to calibrate the relationship between the machine coordinate system Σm set on the machine tool and the camera coordinate system Σc of the camera installed in the machine tool, the control unit 10 executes the program for the camera calibration processing stored in the storage unit 20. In this way, the control unit 10 functions as the machine coordinate measurement unit 11, the image acquisition unit 12 and a calibration unit 13b.

The machine coordinate measurement unit 11 and the image acquisition unit 12 have the same functions as the machine coordinate measurement unit 11 and the image acquisition unit 12 in the first embodiment.

The calibration unit 13b has the same function as the calibration unit 13 in the first embodiment. However, the calibration unit 13b differs from the calibration unit 13 according to the first embodiment in that since the camera 230a is a 3D camera, it is possible to directly acquire the coordinates in the camera coordinate system Σc of the tip end position SP of the touch probe 240 from an image obtained by performing imaging with the camera 230a.

More specifically, as described above, in the third stage, the calibration unit 13b uses formula (12) so as to calculate, from the machine coordinates $(X_{tm}, Y_{tm}, Z_{tm})$ of the tip end position SP in the machine coordinate system Σm and the coordinates $(X_{tc}, Y_{tc}, Z_{tc})$ in the camera coordinate system Σc of the tip end position SP acquired from the image obtained by performing imaging with the camera 230a, the positional relationship t of the camera coordinate system Σc with respect to the machine coordinate system Σm.

The configuration of the camera calibration device 100B according to the third embodiment has been described above.

The operation of the camera calibration device 100B will then be described with reference to a flowchart shown in FIG. 12.

Figure 12:
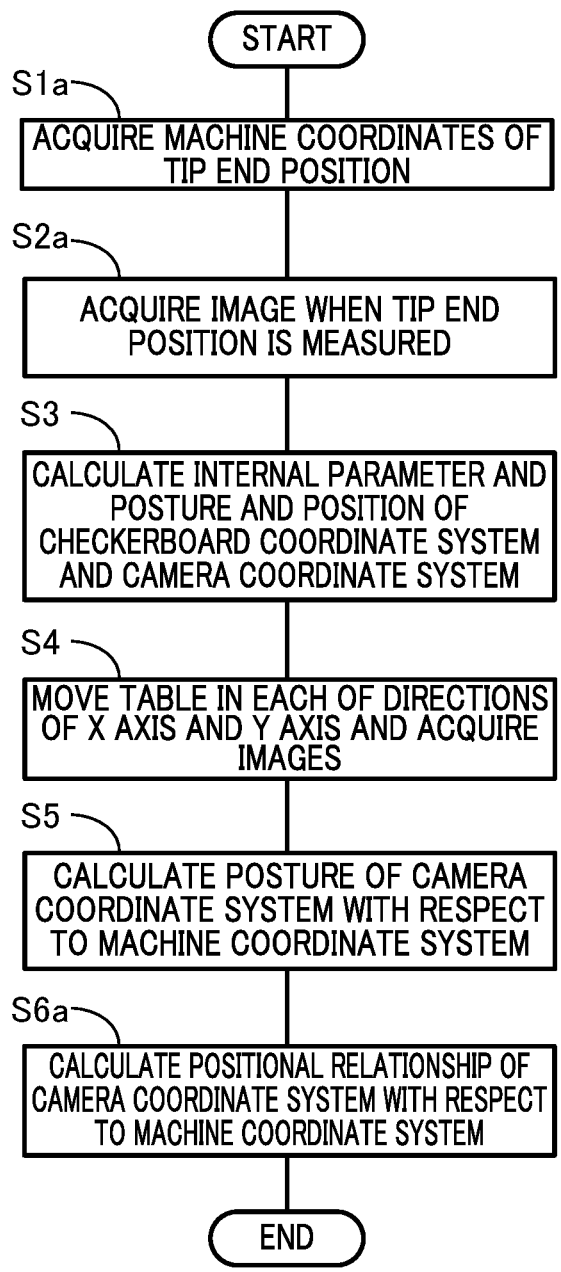
FIG. 12 is a diagram showing an example of camera calibration processing in a numerical controller according to the third embodiment.

FIG. 12 is a diagram showing an example of the camera calibration processing in the camera calibration device 100B according to the third embodiment. In the processing shown in FIG. 12, the same processing as in the steps shown in FIG. 7 are identified with the same step numbers, and the detailed description thereof will be omitted.

The processing shown in FIG. 12 is performed, for example, by the operation of the input device of the camera calibration device 100B by the operator or the like. When the processing shown in FIG. 12 is performed, the operator or the like arranges, as shown in FIG. 11, the checkerboard 250 in an arbitrary position of the table 220 in an arbitrary posture.

In step S1a, the machine coordinate measurement unit 11 acquires the machine coordinates of the tip end position SP detected with the touch probe 240 which is arranged in the machining machine 210 present in the reference position.

In step S2a, the image acquisition unit 12 acquires the image 300b-1 of the touch probe 240 in the machining machine 210 present in the reference position and the checkerboard 250.

In step S3, the calibration unit 13b performs the same processing as processing obtained by replacing step S2 with step S2a and replacing the image 300-1 with the image 300b-1 in the processing described in step 3 of the first embodiment. The calibration unit 13b calculates the internal parameter K and the posture $R_c$ and the positional relationship $t_c$ of the camera coordinate system Σc with respect to the checkerboard coordinate system Σb.

In step S4, the camera calibration device 100B performs the same processing as processing obtained by replacing the image 300-2 with the image 300b-2 and replacing the image 300-3 with the image 300b-3 in the processing described in step S4 in the first embodiment so as to acquire the images 300b-2 and 300b-3.

In step S5, the calibration unit 13b performs the same processing as processing obtained by replacing the image 300-1 with the image 300b-1, replacing the image 300-2 with the image 300b-2 and replacing the image 300-3 with the image 300b-3 in the processing described in step S4 in the first embodiment. The calibration unit 13b calculates the posture R of the camera coordinate system Σc with respect to the machine coordinate system Σm so as to store the calculated posture R in the storage region of the calibration data 23 in the storage unit 20.

In step S6a, the calibration unit 13b uses formulas (12) so as to calculate, from the machine coordinates $(X_{tm}, Y_{tm}, Z_{tm})$ of the tip end position SP in the machine coordinate system Σm, the coordinates $(X_{tc}, Y_{tc}, Z_{tc})$ in the camera coordinate system Σc of the tip end position SP acquired from the image 300a-1 and the posture R, the positional relationship t of the camera coordinate system Σc with respect to the machine coordinate system Σm.

As described above, in the third embodiment, the camera calibration device 100B acquires the machine coordinates of the tip end position SP of the touch probe 240 arranged in the machining machine 210 and the image 300b-1 of the checkerboard 250 arranged in an arbitrary position of the table 220 in an arbitrary posture and the touch probe 240. The camera calibration device 100B also acquires the images 300b-2 and 300b-3 of the checkerboard 250 when the table 220 has been moved in each of the directions of the Xm axis and the Ym axis in the machine coordinate system Σm. The camera calibration device 100B calculates the posture R of the camera coordinate system Σc with respect to the machine coordinate system Σm based on the positional relationship between a plurality of feature points on the checkerboards 250 in the acquired three images 300b-1, 300b-2 and 300b-3. The camera calibration device 100B also calculates, from the acquired machine coordinates ($X_{tm}$, $Y_{tm}$, $Z_{tm}$) of the tip end position SP in the machine coordinate system Σm and the coordinates ($X_{tc}$, $Y_{tc}$, $Z_{tc}$) in the camera coordinate system Σc of the tip end position SP acquired from the image 300b-1, the positional relationship t of the camera coordinate system Σc with respect to the machine coordinate system Σm.

In this way, the camera calibration device 100B arranges the checkerboard 250 in an arbitrary position of the table 220 in an arbitrary posture so as to be able to easily calibrate, even in the machine tool whose flexibility is low, the relationship between the machine coordinate system Σm set on the machine tool and the camera coordinate system Σc of the camera installed in the machine tool. In the camera calibration device 100B, an operation of installing a dedicated calibration instrument in a specified position and a jig for installing the calibration instrument are not needed, and thus it is possible to reduce an operational burden and a facility burden placed on the camera calibration.

The third embodiment has been described above.

Fourth Embodiment

A fourth embodiment will then be described. The fourth embodiment differs from the first embodiment in that the machine tool is a movable-type three-axis machine (a spindle can be moved in the direction of Xm, Ym and Zm axes in the machine coordinate system Σm) in which a table is arranged so as to be fixed and in which only a tool spindle can be moved. The fourth embodiment also differs from the first embodiment in that the tip end of the touch probe arranged in a machining machine is assumed to be a feature point and that in order to determine the posture R and the positional relationship t between the machine coordinate system Σm and the camera coordinate system Σc, four images are needed.

In this way, as the second stage, as will be described later, a camera calibration device 100C uses four images obtained by performing imaging through linear axis movements of the machine tool in two directions so as to determine the posture R of the camera coordinate system Σc with respect to the machine coordinate system Σm.

The first stage and the third stage in the fourth embodiment are the same as in the first embodiment, and thus the detailed description thereof will be omitted.

In this way, the camera calibration device 100C can calibrate the relationship between the machine coordinate system Σm set on the machine tool and the camera coordinate system Σc of the camera installed in the machine tool.

The fourth embodiment will be described below.

Figure 13:
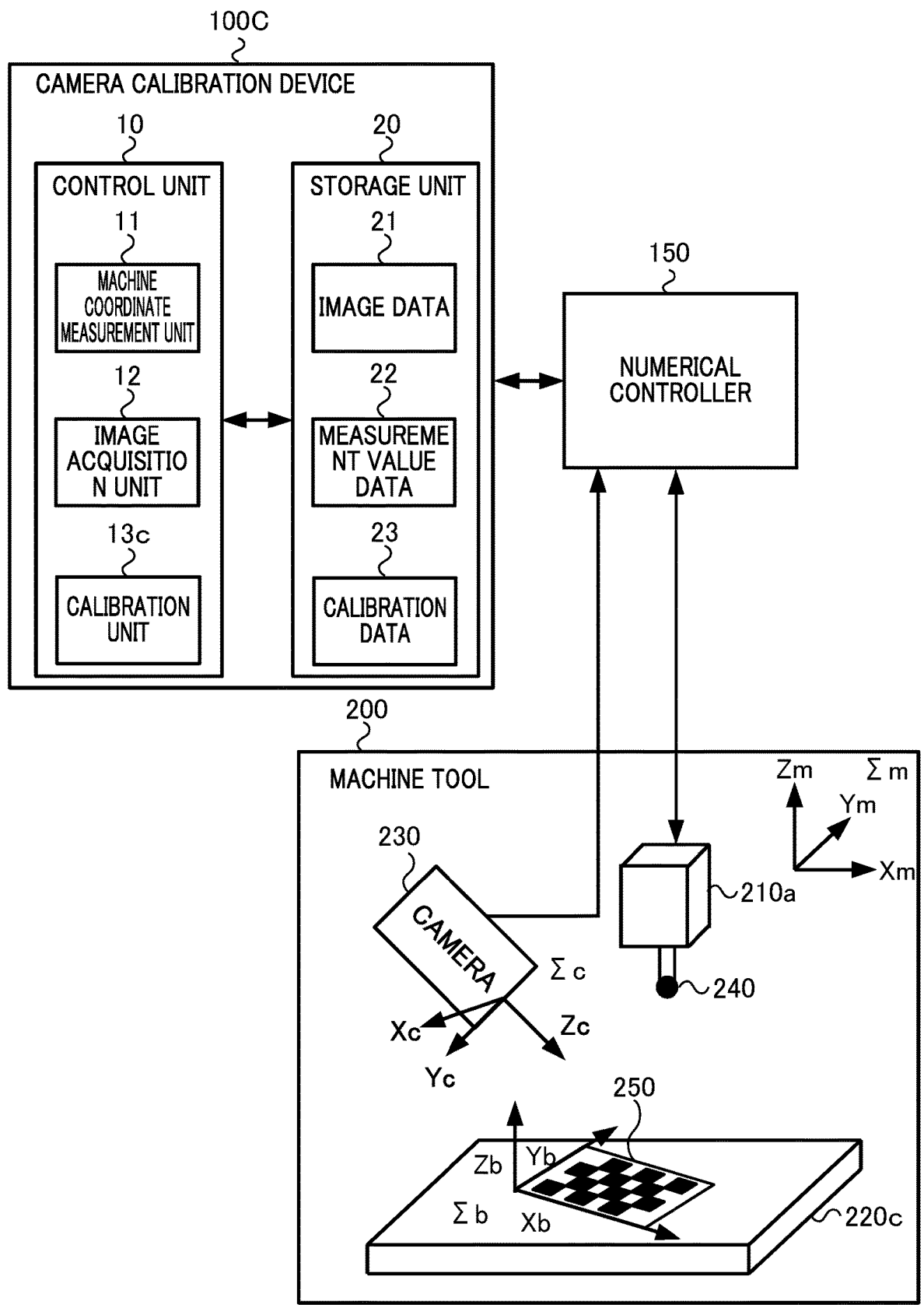
FIG. 13 is a diagram showing an example of a camera calibration device according to a fourth embodiment of the present invention.

FIG. 13 is a diagram showing an example of the camera calibration device according to the fourth embodiment of the present invention. In FIG. 13, elements which have the same functions as the elements of the camera calibration device 100 according to the first embodiment are identified with the same reference numerals, and the detailed descriptions thereof will be omitted.

The camera calibration device 100C according to the fourth embodiment has the same configuration as the camera calibration device 100 according to the first embodiment.

On the other hand, the machine tool 200 is, for example, a movable-type three-axis machine which can move only the tool spindle, and includes the machining machine 210a (tool spindle device), a table 220c and the camera 230.

The machining machine 210a is, for example, a spindle unit, and is moved in each of the directions of the Xm axis, the Ym axis and the Zm axis in the machine coordinate system Σm based on a command of the numerical controller 150.

In the machining machine 210a, the touch probe 240 which measures the machine coordinates of an arbitrary position in the camera calibration processing is arranged at the tip end of the machining machine 210a. There is no limitation to this configuration, and a laser light source or the like may be arranged at the tip end of the machining machine 210a.

For example, the table 220c is arranged so as to be fixed to the machine tool 200, and a workpiece to be machined is arranged on the upper surface thereof.

On the upper surface of the table 220c, in the camera calibration processing, the checkerboard 250 is arranged as the calibration instrument in an arbitrary position in an arbitrary posture. There is no limitation to this configuration, and on the table 220c, a calibration instrument which has a dot pattern or the like may be arranged. The checkerboard 250 is preferably arranged on the table 220c such that in the camera calibration processing, the touch probe 240 arranged at the tip end of the machining machine 210a can touch an arbitrary position on the checkerboard 250.

In the camera calibration device 100C, in order to calibrate the relationship between the machine coordinate system Σm set on the machine tool and the camera coordinate system Σc of the camera installed in the machine tool, the control unit 10 executes the program for the camera calibration processing stored in the storage unit 20. In this way, the control unit 10 functions as the machine coordinate measurement unit 11, the image acquisition unit 12 and a calibration unit 13c.

The machine coordinate measurement unit 11 and the image acquisition unit 12 have the same functions as the machine coordinate measurement unit 11 and the image acquisition unit 12 in the first embodiment.

The calibration unit 13c has the same function as the calibration unit 13 in the first embodiment. However, as described above, the calibration unit 13c assumes that the tip end position SP of the touch probe 240 arranged in the machining machine 210a is one feature point. Hence, the calibration unit 13c differs from the calibration unit 13 in the first embodiment in that in the second stage, four images obtained by performing imaging in four different positions are used so as to calculate the posture R of the camera coordinate system Σc with respect to the machine coordinate system Σm.

<Second Stage>

Figure 14:
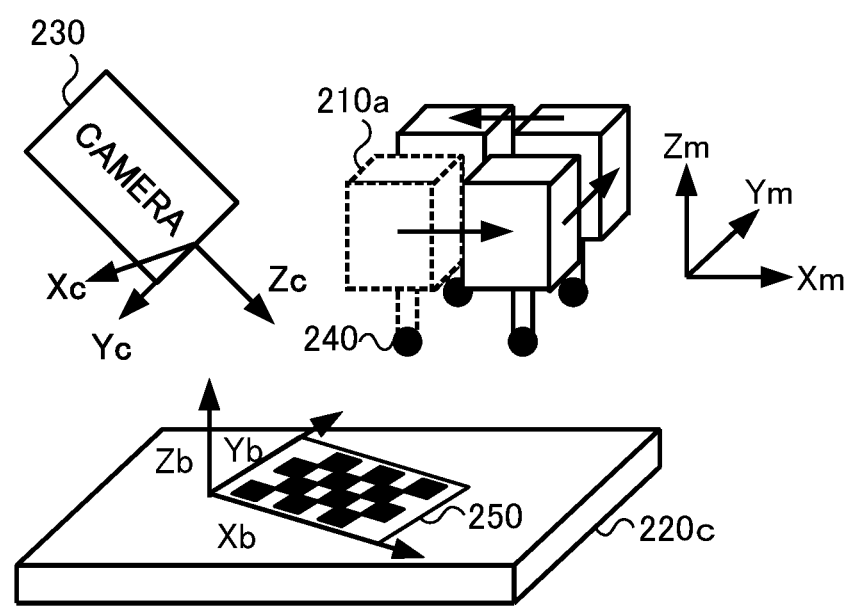
FIG. 14 is a diagram showing an example of the operation of a machining machine in camera calibration processing.

As shown in FIG. 14, the image acquisition unit 12 acquires, from the camera 230, the four images including the touch probe 240 of the machining machine 210a that are obtained by performing imaging in the reference position of the machining machine 210a indicated by broken lines and in three positions in which the machining machine 210a has been moved at a constant height in the direction of the Zm axis in the machine coordinate system Σm on the XmYm plane.

FIG. 14 is a diagram showing an example of the operation of the machining machine 210a in the camera calibration processing. In FIG. 14, the machining machine 210a present in the reference position is indicated by the broken lines. The image acquisition unit 12 acquires an image 300c-2 of the touch probe 240 present in the reference position obtained by performing imaging with the camera 230. Then, as shown in FIG. 14, the control unit 10 moves the machining machine 210a present in the reference position in the direction of the Xm axis in the machine coordinate system Σm with respect to the table 220c by the amount d of movement. The image acquisition unit 12 acquires an image 300c-3 of the touch probe 240 obtained by performing imaging with the camera 230.

Then, the control unit 10 moves the machining machine 210a from the current position in the direction of the Ym axis by the amount d of movement. The image acquisition unit 12 acquires an image 300c-4 of the touch probe 240 obtained by performing imaging with the camera 230. Then, the control unit 10 moves the machining machine 210a from the current position in the direction of the Xm axis by the amount of movement (−d). The image acquisition unit 12 acquires an image 300c-5 of the touch probe 240 obtained by performing imaging with the camera 230.

As shown in FIG. 14, the calibration unit 13c acquires, as in the case of FIG. 4, from the images 300c-2, 300c-3, 300c-4 and 300c-5 obtained by performing imaging in the four positions, the coordinates of the tip end positions SP of the touch probe 240 in the image coordinate system Σi.

Figure 15:
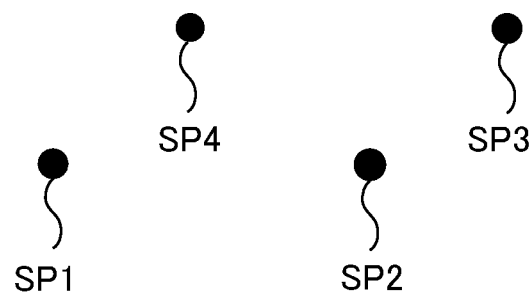
FIG. 15 is a diagram showing an example of a positional relationship between touch points in the image coordinate system which are acquired from four images.

FIG. 15 is a diagram showing an example of a positional relationship between the tip end positions SP1 to SP4 in the image coordinate system Σi which are acquired from the four images 300c-2, 300c-3, 300c-4 and 300c-5. The tip end position SP1 indicates the pixel position of the image 300c-2. The tip end position SP2 indicates the pixel position of the image 300c-3. The tip end position SP3 indicates the pixel position of the image 300c-4. The tip end position SP4 indicates the pixel position of the image 300c-5.

A straight line between the tip end position SP1 and the tip end position SP2 indicates, as in the case of FIG. 6, the direction of the Xm axis in the machine coordinate system Σm. Likewise, a straight line between the tip end position SP3 and the tip end position SP4 indicates the direction of the Xm axis in the machine coordinate system Σm. Then, the four points of the tip end positions SP1 to SP4 are pixels on the two-dimensional image coordinate system Σi, and thus the straight line between the tip end position SP1 and the tip end position SP2 and the straight line between the tip end position SP3 and the tip end position SP4 intersect each other at a certain point, that is, a vanishing point $V_x$. Hence, the calibration unit 13c can calculate, from the coordinates of the tip end positions SP1 to SP4 in the image coordinate system Σi, the vanishing point $V_x$ in the direction of the Xm axis in the machine coordinate system Σm.

A straight line between the tip end position SP1 and the tip end position SP4 indicates, as in the case of FIG. 6, the direction of the Ym axis in the machine coordinate system Σm. Likewise, a straight line between the tip end position SP2 and the tip end position SP3 indicates the direction of the Ym axis in the machine coordinate system Σm. Then, the four points of the tip end positions SP1 to SP4 are pixels on the two-dimensional image coordinate system Σi, and thus the straight line between the tip end position SP1 and the tip end position SP4 and the straight line between the tip end position SP2 and the tip end position SP3 intersect each other at a certain point, that is, a vanishing point $V_y$. Hence, the calibration unit 13c can calculate, from the coordinates of the tip end positions SP1 to SP4 in the image coordinate system Σi, the vanishing point $V_y$ in the direction of the Ym axis in the machine coordinate system Σm.

Hence, the calibration unit 13c can calculate, from the calculated vanishing points $V_x$ and $V_y$ and the internal parameter K, by use of formula (4), row vectors $r_x$, $r_y$ and $r_z$ forming the posture R of the camera coordinate system Σc with respect to the machine coordinate system Σm.

The configuration of the camera calibration device 100C according to the fourth embodiment has been described above.

The operation of the camera calibration device 100C will then be described with reference to a flowchart shown in FIG. 16.

Figure 16:
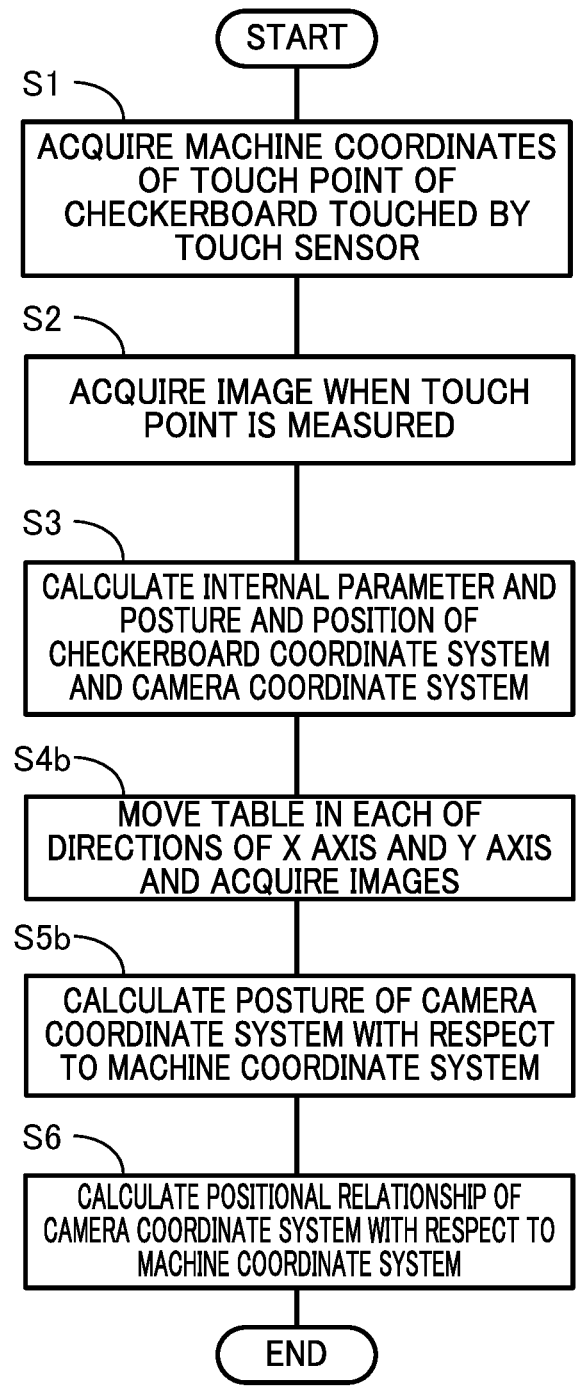
FIG. 16 is a diagram showing an example of the camera calibration processing in the camera calibration device according to the fourth embodiment.

FIG. 16 is a diagram showing an example of the camera calibration processing in the camera calibration device 100C according to the fourth embodiment. In the processing shown in FIG. 16, the same processing as in the steps shown in FIG. 7 are identified with the same step numbers, and the detailed description thereof will be omitted.

The processing shown in FIG. 16 is performed, for example, by the operation of the input device of the camera calibration device 100C by the operator or the like. When the processing shown in FIG. 16 is performed, the operator or the like arranges, as shown in FIG. 13, the checkerboard 250 in an arbitrary position of the table 220c in an arbitrary posture.

In step S1, the machine coordinate measurement unit 11 performs the same processing as in step 1 of the first embodiment so as to acquire the machine coordinates of the touch point TP in the machine coordinate system Σm.

In step S2, the image acquisition unit 12 performs the same processing as in step 2 of the first embodiment so as to acquire, from the camera 230, the image 300-1 of the touch probe 240 and the checkerboard 250 obtained by performing imaging with the camera 230.

In step S3, the calibration unit 13c performs the same processing as in step 3 of the first embodiment so as to calculate, by a known method, from the image 300-1, the internal parameter K and the posture $R_c$ and the positional relationship $t_r$ of the camera coordinate system Σc with respect to the checkerboard coordinate system Σb.

In step S4b, as shown in FIG. 14, the control unit 10 moves the machining machine 210a present in the reference position in each of the directions of the Xm axis and the Ym axis in the machine coordinate system Σm by the amount d of movement. The image acquisition unit 12 acquires the images 300c-2, 300c-3, 300c-4 and 300c-5.

In step S5b, the calibration unit 13c uses the coordinates in the image coordinate system Σi of the tip end positions SP1 to SP4 in the acquired four images 300c-2, 300c-3, 300c-4 and 300c-5 so as to calculate the vanishing points $V_x$ and $V_y$ in the directions of the Xm axis and the Ym axis in the machine coordinate system Σm. The calibration unit 13c calculates, from the calculated vanishing points $V_x$ and $V_y$ and the internal parameter K, by use of formula (4), the posture R of the camera coordinate system Σc with respect to the machine coordinate system Σm.

In step S6, the calibration unit 13c performs the same processing as in step S6 of the first embodiment so as to calculate the positional relationship t of the camera coordinate system Σc with respect to the machine coordinate system Σm. The calibration unit 13c stores the calculated positional relationship t in the storage region of the calibration data 23 in the storage unit 20.

As described above, in the fourth embodiment, the camera calibration device 100C acquires the machine coordinates of the touch point TP touched by the touch probe 240 arranged in the machining machine 210a on the checkerboard 250 arranged in an arbitrary position of the table 220c in an arbitrary posture. Then, the camera calibration device 100C acquires the image 300-1 of the touch probe 240 and the checkerboard 250 when the touch probe 240 touches the touch point TP. The camera calibration device 100C also acquires the four images 300c-2, 300c-3, 300c-4 and 300c-5 of the touch probe 240 when the machining machine 210a has been moved in each of the directions of the Xm axis and the Ym axis in the machine coordinate system Σm. The camera calibration device 100C uses the coordinates in the image coordinate system Σi of the touch point TP in the acquired image 300-1, the coordinates in the image coordinate system Σi of the tip end positions SP in the acquired four images 300c-2, 300c-3, 300c-4 and 300c-5 and the machine coordinates of the touch point TP in the machine coordinate system Σm so as to calculate, through the checkerboard coordinate system Σb, the posture R and the positional relationship t of the camera coordinate system Σc with respect to the machine coordinate system Σm.

In this way, the camera calibration device 100C arranges the checkerboard 250 in an arbitrary position of the table 220c in an arbitrary posture so as to be able to easily calibrate, even in the machine tool whose flexibility is low, the relationship between the machine coordinate system Σm set on the machine tool and the camera coordinate system Xc of the camera installed in the machine tool. In the camera calibration device 100C, an operation of installing a dedicated calibration instrument in a specified position and a jig for installing the calibration instrument are not needed, and thus it is possible to reduce an operational burden and a facility burden placed on the camera calibration.

The fourth embodiment has been described above.

Fifth Embodiment

A fifth embodiment will then be described. The fifth embodiment differs from the first embodiment in that the machine tool is a movable-type three-axis machine in which a table is arranged so as to be fixed and in which only a tool spindle can be moved, and that instead of being arranged on the table, the checkerboard is arranged in an arbitrary position of the side surface of the machining machine seen from the camera in an arbitrary posture.

Hence, the fifth embodiment differs from the first embodiment in that in the first stage, a camera calibration device 100D acquires one point whose machine coordinates are known and which is the tip end position of the touch probe 240 and an image of the tip end position and the checkerboard 250.

The fifth embodiment also differs from the first embodiment in that in the second stage, two directions in the machine tool are the directions of the Ym axis and the Zm axis in the machine coordinate system Σm. However, the Xm axis and the Ym axis in the machine coordinate system Σm in the first embodiment are replaced with the Ym axis and the Zm axis. In this way, the camera calibration device 100D uses, as will be described later, as in the first embodiment, the one point whose machine coordinates are known, an image obtained by imaging the one known point and an image obtained by performing imaging when the machine tool makes linear axis movements in two direction so as to determine the posture R of the camera coordinate system Σc with respect to the machine coordinate system Σm.

Furthermore, as the third stage, as will be described later, the camera calibration device 100D uses the one point whose machine coordinates are known, the image obtained by imaging the one known point, the image obtained by performing imaging when the machine tool makes linear axis movements in two directions and the posture R of the camera coordinate system Σc with respect to the machine coordinate system Σm. In this way, the camera calibration device 100D can determine the positional relationship t of the camera coordinate system Σc with respect to the machine coordinate system Σm.

In this way, the camera calibration device 100D can calibrate the relationship between the machine coordinate system Σm set on the machine tool and the camera coordinate system Σc of the camera installed in the machine tool.

As described above, in the fifth embodiment, the posture and the position of the camera coordinate system Σc with respect to the machine coordinate system Σm are calculated through the table coordinate system Σt set in the table.

The fifth embodiment will be described below.

Figure 17:
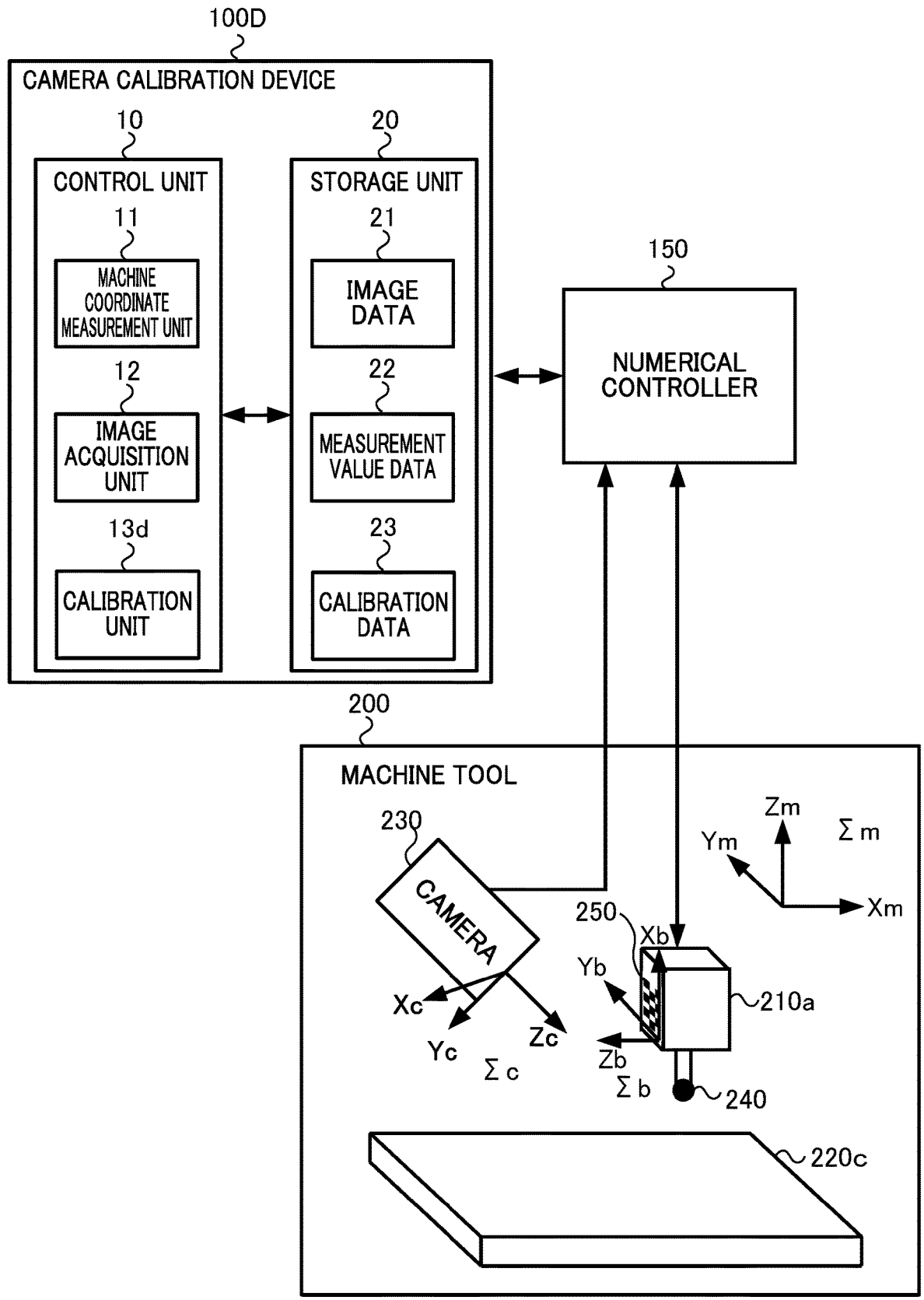
FIG. 17 is a diagram showing an example of a camera calibration device according to a fifth embodiment of the present invention.

FIG. 17 is a diagram showing an example of the camera calibration device according to the fifth embodiment of the present invention. In FIG. 17, elements which have the same functions as the elements of the camera calibration device 100 according to the first embodiment are identified with the same reference numerals, and the detailed descriptions thereof will be omitted.

The camera calibration device 100D according to the fifth embodiment has the same configuration as the camera calibration device 100 according to the first embodiment.

On the other hand, the machine tool 200 has the same configuration as the machine tool 200 according to the fourth embodiment. For example, the checkerboard 250 is arranged in an arbitrary position of the side surface of the machining machine 210a seen from the camera 230 in an arbitrary posture. In this way, the checkerboard coordinate system Σb is set on the side surface of the machining machine 210a. There is no limitation to this configuration, and in the machining machine 210a, a calibration instrument which has a dot pattern or the like may be arranged.

In the camera calibration device 100D, in order to calibrate the relationship between the machine coordinate system Σm set on the machine tool and the camera coordinate system Σc of the camera installed in the machine tool, the control unit 10 executes the program for the camera calibration processing stored in the storage unit 20. In this way, the control unit 10 functions as the machine coordinate measurement unit 11, the image acquisition unit 12 and a calibration unit 13d.

The machine coordinate measurement unit 11 and the image acquisition unit 12 have the same functions as the machine coordinate measurement unit 11 and the image acquisition unit 12 in the first embodiment.

<First Stage>

For example, the machine coordinate measurement unit 11 acquires the machine coordinates of the tip end position SP detected with the touch probe 240 of the machining machine 210a which is present in the reference position. The image acquisition unit 12 acquires an image 300d-1 of the touch probe 240 and the checkerboard 250 when the machine coordinates of the tip end position SP are detected.

<Second Stage>

Figure 18:
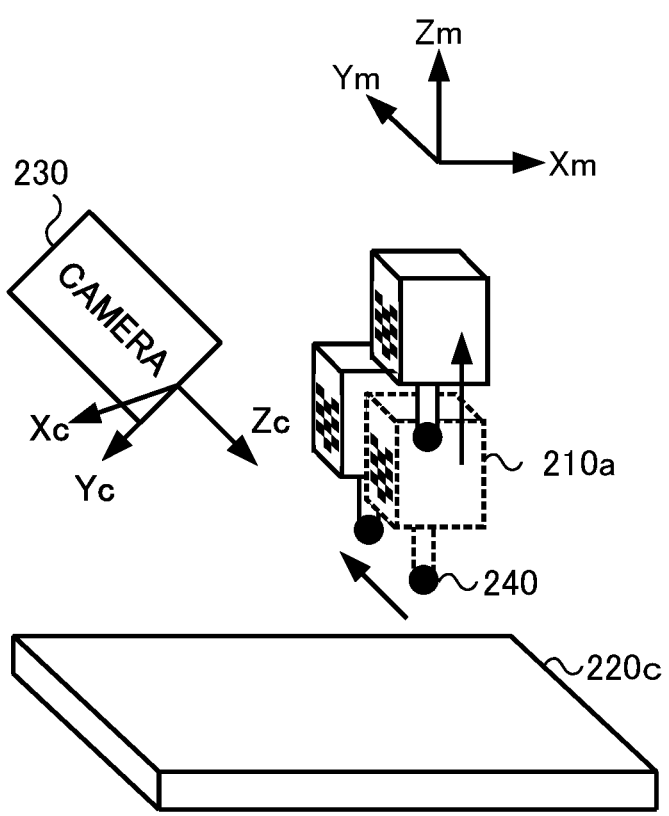
FIG. 18 is a diagram showing an example of the operation of a machining machine in camera calibration processing.

In the camera calibration processing, as shown in FIG. 18, the control unit 10 moves the machining machine 210a present in the reference position in each of the directions of the Ym axis and the Zm axis in the machine coordinate system Σm by the amount d of movement. The image acquisition unit 12 acquires an image 300d-2 and an image 300d-3 of the checkerboard 250 in the machining machine 210a which has been moved in the individual directions.

FIG. 18 is a diagram showing an example of the operation of the machining machine 210a in the camera calibration processing. In FIG. 18, the machining machine 210a present in the reference position is indicated by broken lines.

In the image 300d-2 of the checkerboard 250 which has been moved in the direction of the Ym axis and the image 300d-3 of the checkerboard 250 which has been moved in the direction of the Zm axis, the tip end of the touch probe 240 may not be imaged.

As in the first embodiment, the calibration unit 13d calculates, based on the feature points of checkerboards 250 in the images 300d-1, 300d-2 and 300d-3, vanishing points $V_x$ and $V_y$ in the individual directions of the Xm axis and the Ym axis in the machine coordinate system Σm. The calibration unit 13d can calculate, from the calculated vanishing points $V_x$ and $V_y$ and the internal parameter K, by use of formula (4), row vectors $r_x$, $r_y$ and $r_z$ forming the posture R of the camera coordinate system Σc with respect to the machine coordinate system Σm.

<Third Stage>

Then, the calibration unit 13d acquires, based on the machine coordinates $(X_{tm}, Y_{tm}, Z_{tm})$ in the machine coordinate system Σm of the tip end position SP detected in the first stage, the machine coordinates $(X_{tm}, Y_{tm}+d, Z_{tm})$ and $(X_{tm}, Y_{tm}, Z_{tm}+d)$ of the tip end positions SP when the images 300d-2 and 300d-3 are obtained by performing imaging. As in the case of FIG. 4, the calibration unit 13d also acquires, from the acquired three images 300d-1, 300d-2 an 300d-3, the coordinates $(x_{to}, y_{to})$, $(x_{t1}, y_{t1})$ and $(x_{t2}, y_{t2})$ of the tip end positions SP in the image coordinate system Σi. Here, $(x_{to}, y_{to})$ indicates the coordinates of the tip end position SP in the image 300d-1. Also, $(x_{t1}, y_{t1})$ indicates the coordinates of the tip end position SP in the image 300d-1. Also, $(x_{t2}, y_{t2})$ indicates the coordinates of the tip end position SP in the image 300d-3.

Then, the calibration unit 13d associates, as indicated in formula (13), the machine coordinates $(X_{tm}, Y_{tm}, Z_{tm})$, $(X_{tm}, Y_{tm}+d, Z_{tm})$ and $(X_{tm}, Y_{tm}, Z_{tm}+d)$ of the individual tip end positions in the machine coordinate system Σm with the coordinates $(x_{to}, y_{to})$, $(x_{t1}, y_{t1})$ and $(x_{t2}, y_{t2})$ of the tip end positions SP in the image coordinate system Σi. The calibration unit 13d solves formula (13), and thereby can calculate the positional relationship t of the camera coordinate system Σc with respect to the machine coordinate system Σm.

[Math. 11]

$$\alpha K^{-1} \begin{pmatrix} x_{t0} \\ y_{t0} \\ 1 \end{pmatrix} = R \begin{pmatrix} X_{tm} \\ Y_{tm} \\ Z_{tm} \end{pmatrix} + t \qquad (13)$$

$$\beta K^{-1} \begin{pmatrix} x_{t1} \\ y_{t1} \\ 1 \end{pmatrix} = R \begin{pmatrix} X_{tm} \\ Y_{tm}+d \\ Z_{tm} \end{pmatrix} + t$$

$$\gamma K^{-1} \begin{pmatrix} x_{t2} \\ y_{t2} \\ 1 \end{pmatrix} = R \begin{pmatrix} X_{tm} \\ Y_{tm} \\ Z_{tm}+d \end{pmatrix} + t$$

In this way, as the third stage, the camera calibration device 100D can determine the positional relationship t of the camera coordinate system Σc with respect to the machine coordinate system Σm.

The configuration of the camera calibration device 100D according to the fifth embodiment has been described above.

The operation of the camera calibration device 100D will then be described with reference to a flowchart shown in FIG. 19.

Figure 19:
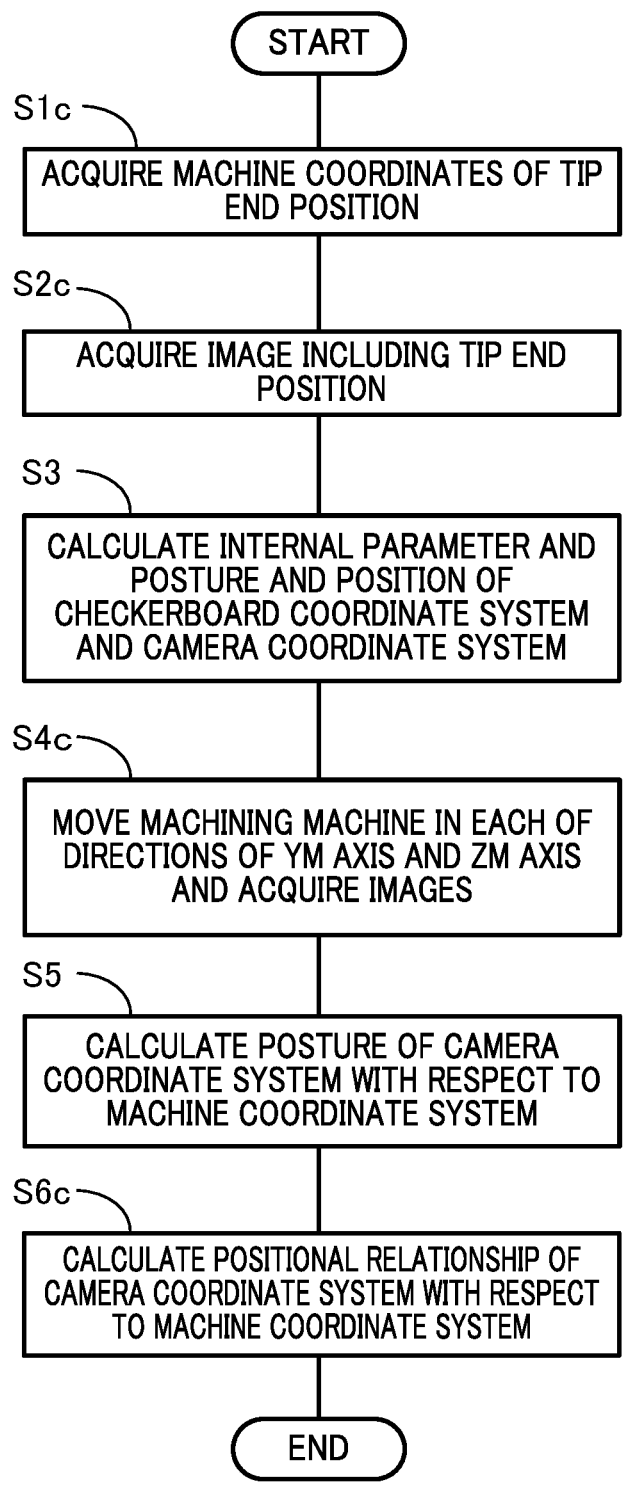
FIG. 19 is a diagram showing an example of the camera calibration processing in the camera calibration device according to the fifth embodiment.

FIG. 19 is a diagram showing an example of the camera calibration processing in the camera calibration device 100D according to the fifth embodiment. In the processing shown in FIG. 19, the same processing as in the steps shown in FIG. 7 are identified with the same step numbers, and the detailed description thereof will be omitted.

The processing shown in FIG. 19 is performed, for example, by the operation of the input device of the camera calibration device 100D by the operator or the like. When the processing shown in FIG. 19 is performed, the operator or the like arranges, as shown in FIG. 17, the checkerboard 250 in an arbitrary position of the side surface of the machining machine 210a in an arbitrary posture.

In step S1c, the machine coordinate measurement unit 11 acquires the machine coordinates of the tip end position SP detected with the touch probe 240 of the machining machine 210a which is present in the reference position.

In step S2c, the image acquisition unit 12 acquires the image 300d-1 of the touch probe 240 and the checkerboard 250 obtained by performing imaging when the machine coordinates of the tip end position SP are detected.

In step S3, the calibration unit 13d performs the same processing as in step 3 of the first embodiment so as to calculate, for example, by the method of Tsai, from the image 300d-1 acquired in step S2, the internal parameter K and the posture $R_c$ and the positional relationship $t_c$ of the camera coordinate system Σc with respect to the checkerboard coordinate system Σb.

In step S4c, as shown in FIG. 18, the control unit 10 moves the machining machine 210a present in the reference position in the direction of the Ym axis by the amount d of movement. The image acquisition unit 12 acquires the image 300d-2 of the checkerboard 250 which has been moved. Then, the control unit 10 moves the machining machine 210a present in the reference position in the direction of the Zm axis by the amount d of movement. The image acquisition unit 12 acquires the image 300d-3 of the checkerboard 250 which has been moved.

In step S5, the calibration unit 13d performs the same processing as processing obtained by replacing the Xm axis with the Ym axis and replacing the Ym axis with the Zm axis in the processing described in step S4 in the first embodiment. The calibration unit 13d calculates the posture R of the camera coordinate system Σc with respect to the machine coordinate system Σm.

In step S6c, the calibration unit 13d calculates, from the machine coordinates $(X_{tm}, Y_{tm}, Z_{tm})$, $(X_{tm}, Y_{tm}+d, Z_{tm})$ and $(X_{tm}, Y_{tm}, Z_{tm}+d)$ of the tip end positions SP in the machine coordinate system Σm and the coordinates $(x_{to}, y_{to})$, $(x_{t1}, y_{t1})$ and $(x_{t2}, y_{t2})$ of the tip end positions SP in the image coordinate system Σi, by use of formula (13), the positional relationship t of the camera coordinate system Σc with respect to the machine coordinate system Σm.

As described above, in the fifth embodiment, the camera calibration device 100D acquires the machine coordinates of the tip end position SP detected with the touch probe 240 of the machining machine 210a present in the reference position and the image 300d-1 of the touch probe 240 and the checkerboard 250. The camera calibration device 100D also acquires the images 300d-2 and 300d-3 of the touch probe 240 and the checkerboard 250 in the machining machine 210a which has been moved in each of the directions of the Ym axis and the Zm axis. The camera calibration device 100D uses the acquired three images 300d-1, 300d-2 and 300d-3 and the machine coordinates of the tip end positions SP in the machine coordinate system Σm so as to calculate the posture R and the positional relationship t of the camera coordinate system Σc with respect to the machine coordinate system Σm.

In this way, the camera calibration device 100D arranges the checkerboard 250 in an arbitrary position of the side surface of the machining machine 210a in an arbitrary posture so as to be able to easily calibrate, even in the machine tool whose flexibility is low, the relationship between the machine coordinate system Σm set on the machine tool and the camera coordinate system Σc of the camera installed in the machine tool. In the camera calibration device 100D, an operation of installing a dedicated calibration instrument in a specified position and a jig for installing the calibration instrument are not needed, and thus it is possible to reduce an operational burden and a facility burden placed on the camera calibration.

The fifth embodiment has been described above.

Variation of Fifth Embodiment

Although in the camera calibration device 100D according to the fifth embodiment, the checkerboard 250 is arranged on the side surface of the machining machine 210a, there is no limitation to this configuration. For example, as a variation of the fifth embodiment, the checkerboard 250 may be arranged in a position to which a tool for the machining machine 210a is attached.

In this case, the camera calibration device 100D assumes that the machine coordinates of one point (intersection between a tool spindle line and the XbYb plane of the checkerboard coordinate system Σb) on the checkerboard 250 is known so as to calculate the posture of the XbYb plane of the checkerboard 250.

Although the first to fifth embodiments of the present invention have been described, the present invention is not limited to the embodiments described above. The effects described in the embodiments described above are simply a list of the most preferred effects produced from the present invention, and the effects of the present invention are not limited to those described in the embodiments.

<Flexibility of System Configuration>

Although in the description of the embodiments discussed above, the case where the camera calibration device 100 is arranged independently of the numerical controller 150 is illustrated, there is no limitation to this case. The camera calibration device 100 may be a distributed processing system in which the functions of the camera calibration device 100 are distributed to a plurality of serves as necessary. By utilization of a virtual server function and the like on a cloud, the individual functions of the camera calibration device 100 may be realized. The numerical controller 150 may have the functions of part of the camera calibration device 100.

Variation 1 of Embodiments

Although in the first to fourth embodiments, the camera 230 is arranged in the fixed position within the machine tool 200 which is different from the machining machine 210 (210a), there is no limitation to this configuration. For example, the camera 230 may be arranged in the machining machine 210 (210a). In this case, the camera 230 is preferably arranged in the position of the machining machine 210 (210a) in which the camera 230 can image the tip end of the touch probe 240 together with the table 220 and the checkerboard 250.

In this way, the camera 230 images the checkerboard 250 from the direction of the Zm axis, and thus the camera calibration device 100 (100C) can highly accurately calculate a plurality of feature points in the checkerboard 250.

Variation 2 of Embodiments

Although in the first and third to fifth embodiments, the camera calibration device 100 (100B, 100C, 100D) calculates the internal parameter and the posture $R_c$ and the positional relationship $t_c$ of the camera coordinate system Σc with respect to the checkerboard coordinate system Σb, there is no limitation to this configuration. Before the camera calibration processing, by a known method, the camera calibration device 100 (100B, 100C, 100D) may previously calculate, from images of the checkerboard or the like arranged in the table 220 or the machining machine 210a, the internal parameter K and the posture $R_c$ and the positional relationship $t_c$ of the camera coordinate system Σc with respect to the checkerboard coordinate system Σb.

In this way, the camera calibration device 100 (100B, 100C, 100D) can reduce the processing time of the camera calibration processing.

EXPLANATION OF REFERENCE NUMERALS 10 control unit
20 storage unit
11 machine coordinate measurement unit
12 image acquisition unit
13 calibration unit
100 camera calibration device
150 numerical controller
200 machine tool

What is claimed is:

1. A camera calibration device which calibrates an imaging means included in a machine tool,
wherein the machine tool includes:
an acquisition means which acquires one point whose machine coordinates are known;
the imaging means which images the one point whose machine coordinates are known and a pattern including a feature used for calibration; and
a drive mechanism which linearly moves a table or a spindle in two orthogonal directions in a machine coordinate system,
the pattern including the feature used for the calibration is arranged in an arbitrary positional posture with respect to the machine coordinate system at a position which is movable relative to and recognizable to the imaging means upon a movement of the drive mechanism, and an image obtained by imaging the one point whose machine coordinates are known and the pattern including the feature used for the calibration and images obtained by imaging the pattern including the feature used for the calibration or/and the one point whose machine coordinates are known when the drive mechanism linearly moves the table or the spindle in the two orthogonal directions in the machine coordinate system are used to calculate a positional posture relationship between the machine coordinate system and the pattern including the feature used for the calibration such that an external parameter indicating a positional posture relationship between the machine coordinate system and a camera coordinate system is calculated.

2. The camera calibration device according to claim 1, wherein as the pattern including the feature used for the calibration, calibration instruments of a checkerboard and a dot pattern are included.

3. The camera calibration device according to claim 1, wherein as the pattern including the feature used for the calibration, a scratch, a corner point and a pattern on the table are included.

4. The camera calibration device according to claim 1, wherein when a plane formed with a pattern including a plurality of features used for the calibration is parallel to a plane of the machine coordinate system, the external parameter of the imaging means is calculated by an operation of the drive mechanism in one direction.

5. The camera calibration device according to claim 1, wherein the imaging means is a 3D camera.

6. The camera calibration device according to claim 1, wherein the pattern including the feature used for the calibration is arranged on a side surface of the spindle or in a position to which a tool for the spindle is attached.

7. A camera calibration method which is realized by a computer and which calibrates an imaging means included in a machine tool, wherein the machine tool includes:

an acquisition means which acquires one point whose machine coordinates are known;

the imaging means which images the one point whose machine coordinates are known and a pattern including a feature used for calibration; and a drive mechanism which linearly moves a table or a spindle in two orthogonal directions in a machine coordinate system, the pattern including the feature used for the calibration is arranged in an arbitrary positional posture with respect to the machine coordinate system at a position which is movable relative to and recognizable to the imaging means upon a movement of the drive mechanism, and an image obtained by imaging the one point whose machine coordinates are known and the pattern including the feature used for the calibration and images obtained by imaging the pattern including the feature used for the calibration or/and the one point whose machine coordinates are known when the drive mechanism linearly moves the table or the spindle in the two orthogonal directions in the machine coordinate system are used to calculate a positional posture relationship between the machine coordinate system and the pattern including the feature used for the calibration such that an external parameter indicating a positional posture relationship between the machine coordinate system and a camera coordinate system is calculated.

* * * * *